United States Patent
Iida et al.

(10) Patent No.: US 7,230,642 B2
(45) Date of Patent: Jun. 12, 2007

(54) APPARATUS AND METHOD FOR CONVERTING SPECTRAL DATA OF AN OBJECT IN A PHOTOGRAPHING ENVIRONMENT INTO SPECTRAL DATA IN AN OBSERVATION ENVIRONMENT

(75) Inventors: Yoshiko Iida, Tokyo (JP); Takeshi Makita, Shizuoka (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 10/012,377

(22) Filed: Dec. 12, 2001

(65) Prior Publication Data

US 2002/0113880 A1  Aug. 22, 2002

(30) Foreign Application Priority Data

Dec. 12, 2000  (JP) ............................ 2000-378021
Dec. 7, 2001  (JP) ............................ 2001-373597

(51) Int. Cl.
H04N 5/235 (2006.01)
(52) U.S. Cl. .................................................. 348/222.1
(58) Field of Classification Search ................. 348/222, 348/333.02, 333.04, 231.1, 223.1, 222.1
See application file for complete search history.

(56) References Cited

U.S. PATENT DOCUMENTS

| | | | | |
|---|---|---|---|---|
| 4,855,814 A | * | 8/1989 | Shiraishi et al. | 348/224.1 |
| 5,099,313 A | * | 3/1992 | Suemoto et al. | 348/226.1 |
| 5,617,139 A | * | 4/1997 | Okino | 348/223.1 |
| 5,864,364 A | * | 1/1999 | Ohyama et al. | 348/211.14 |

FOREIGN PATENT DOCUMENTS

JP  9-172649  6/1997

* cited by examiner

Primary Examiner—Tuan Ho
Assistant Examiner—James M. Hannett
(74) Attorney, Agent, or Firm—Fitzpatrick, Cella, Harper & Scinto

(57) ABSTRACT

A photographing environmental light spectral distribution detector acquires spectral distribution data of photographing environmental light upon photographing an object image, and an observation environmental light spectral distribution data detector acquires those of environmental light used upon observing a reproduced image. A signal processor converts an image signal photographed by a camera under the photographing environmental light in accordance with the spectral distribution data of respective types of environmental light, generates colorimetric data that an output unit can output, and outputs the colorimetric data to the output unit, thus accurately reproducing the original color of the object while the object is placed under the observation environmental light.

26 Claims, 28 Drawing Sheets

F I G. 20

| ID | TYPE OF ENVIRONMENTAL LIGHT | SPECTRAL DISTRIBUTION DATA |
|---|---|---|
| ABC | PHOTOGRAPHING ENVIRONMENT 1 | 380 : <br> 780 : |
| ABC | PHOTOGRAPHING ENVIRONMENT 2 | 380 : <br> 780 : |
| ABC | OBSERVATION ENVIRONMENT 1 | 380 : <br> 780 : |
| 155M | PHOTOGRAPHING ENVIRONMENT 1 | 380 : <br> 780 : |
| 155M | OBSERVATION ENVIRONMENT 2 | 380 : <br> 780 : |

APPARATUS AND METHOD FOR CONVERTING SPECTRAL DATA OF AN OBJECT IN A PHOTOGRAPHING ENVIRONMENT INTO SPECTRAL DATA IN AN OBSERVATION ENVIRONMENT

FIELD OF THE INVENTION

The present invention relates to an image processing apparatus and method for receiving an image signal obtained by photographing an object under given environmental light, and executing an image process of the image signal in consideration of observation environmental light used upon reproducing and observing the image signal, and a recording medium.

BACKGROUND OF THE INVENTION

In an image input apparatus such as a camera or the like, which photographs an object and generates an image signal, the color specification of the object largely changes depending on illumination light with which the object is illuminated. However, the relationship between the illumination light and an image signal obtained from the object is not quantified, and no color conversion scheme for converting the color specification of an object into a color specification obtained when the object is illuminated with arbitrary another environmental light is available.

Therefore, color matching is made between such image input apparatus and an image output apparatus for receiving an image signal from the image input apparatus and displaying or printing the image signal, under the assumption that the observation environment of an output image of the image output apparatus is the same as environmental light upon photographing in the image input apparatus. Therefore, it is impossible to make color matching between an input image signal and an output image for the color specification under environmental light other than those which are defined in advance.

When environmental light upon photographing an input image in the image input apparatus, and observation environmental light of an image in the image output apparatus are different from conditions defined in advance, the color of an image output by an image process based on a conventional color matching method appears to have different color appearance from that of the input image.

An example the implements perfect color matching between environments of different spectral distribution data of environmental light using spectral distribution data is disclosed in Japanese Patent Laid-Open No. 9-172649. However, this method requires calculation of spectral reflectance R(λ) of an object.

SUMMARY OF THE INVENTION

The present invention has been made in consideration of the above prior art, and has as its object to provide an image processing apparatus and method, which can process an image signal of an object and can output it as an image with optimal color specification on the basis of photographing environmental light upon photographing the object and observation environmental light of an output image based on the image signal of the photographed object, and a storage medium.

It is another object of the present invention to provide an image processing apparatus and method, which can reproduce an image of an object with color specification which can reproduce the color of the image of the reproduced object as original color of the object under observation environmental light, even when photographing environmental light of the object is different from the observation environmental light, and a recording medium.

In order to attain the above-described objects, the image processing apparatus of the present invention comprising the structure as follows.

An image processing apparatus comprising: acquisition means for acquiring photographing environment information of an image signal of a photographed object, and observation environment information of an observation environment in which an image output from image output means for outputting an image is to be observed; conversion means for converting the image signal on the basis of the photographing environment information and the observation environment information; and data output means for generating and outputting an output signal to be output to the image output means on the basis of the image signal converted by said conversion means.

In order to attain the above-described objects, the image processing method of the present invention comprising the steps as follows.

An image processing method comprising: an acquisition step of acquiring photographing environment information of an image signal of a photographed object, and observation environment information of an observation environment in which an image output from an image output device for outputting an image is to be observed; a conversion step of converting the image signal on the basis of the photographing environment information and the observation environment information; and a data output step of generating and outputting an output signal to be output to the image output device on the basis of the image signal converted in said conversion step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 20 is a table showing an example of the data format of a data storage unit according to the ninth embodiment of the present invention, in which the user registers environmental light spectral distribution data;

DESCRIPTION OF PREFERRED EMBODIMENTS

Preferred embodiments of the present invention will be described in detail hereinafter with reference to the accompanying drawings.

Figure 1:
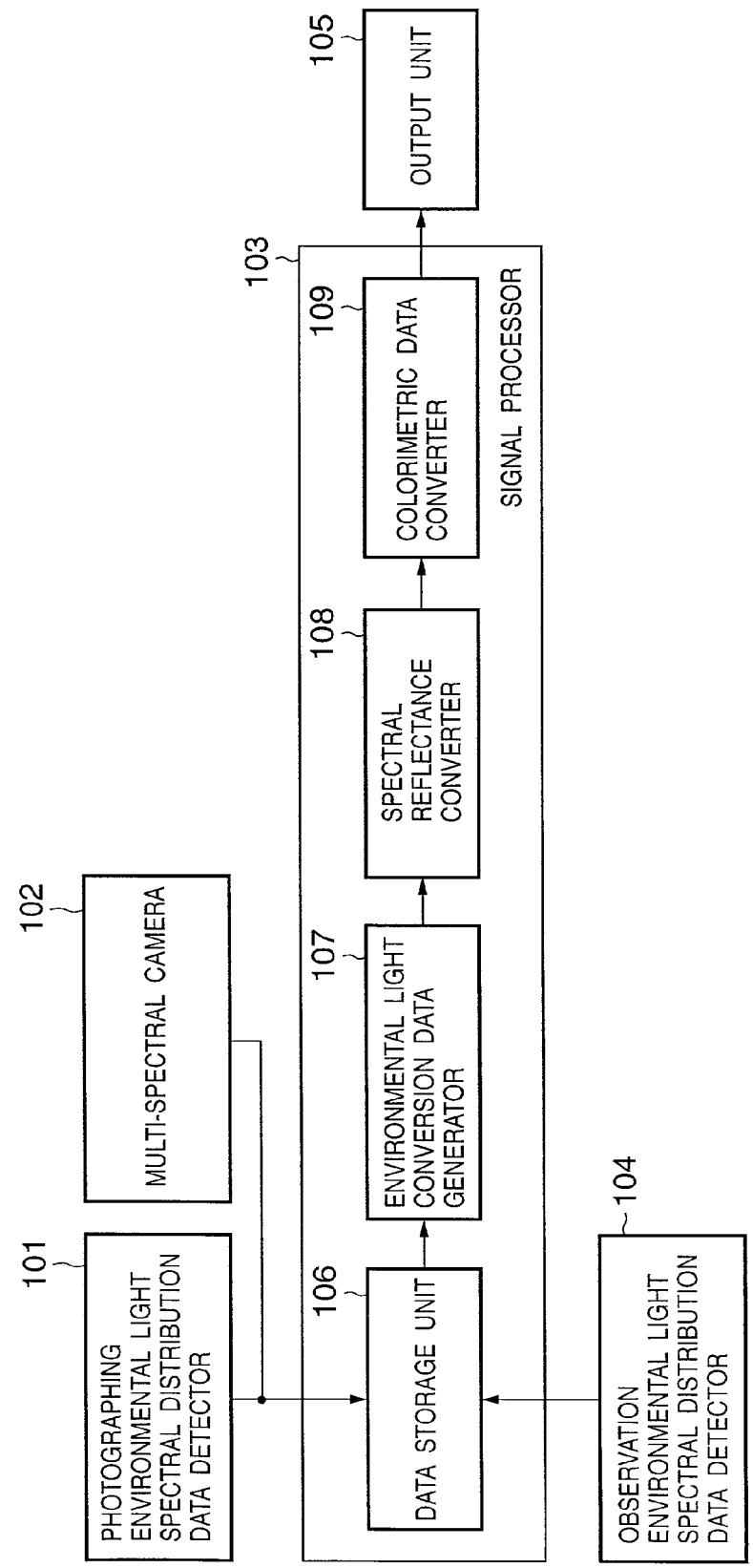
FIG. 1 is a block diagram showing the functional arrangement according to an embodiment of the present invention.

FIG. 1 is a block diagram showing an outline of the functional arrangement of an image processing apparatus according to an embodiment of the present invention.

Referring to FIG. 1, reference numeral 101 denotes a spectral distribution data detector of photographing environmental light, which detects spectral distribution data of environmental light (illumination light) in a photographing environment for photographing an object by a photographing apparatus. Reference numeral 102 denotes a multi-spectral camera for photographing an object in the photographing environment, i.e., the object illuminated with photographing environmental light, and acquiring spectral distribution data (image signal) for respective pixels of the object. Reference numeral 104 denotes a spectral distribution data detector of observation environmental light, which detects spectral distribution data of environmental light (illumination light) in an observation environment, which is highly likely to be environmental light different from the photographing environmental light photographed by the multi-spectral camera 102. Reference numeral 103 denotes a signal processor for receiving spectral distribution data for respective pixels of the object from the multi-spectral camera 102, which is illuminated with environmental light (illumination light) in a given photographing environment, converting them into spectral distribution data for respective pixels of a color specification which is illuminated with observation environmental light in a reproduction environment and has accurate color reproducibility under the observation environmental light, and then converting the converted data into colorimetric data. Reference numeral 106 denotes a data storage unit which receives, stores, and holds spectral distribution data of photographing environmental light input from the photographing environmental light spectral distribution data detector 101, spectral distribution data (image signal) for respective pixels of an object image illuminated with the photographing environmental light from the multi-spectral camera 102, and multi-spectral distribution data of observation environmental light detected by the observation environmental light spectral distribution data detector 104. Reference numeral 107 denotes an environmental light conversion data generator for generating environmental light conversion data used to convert environmental light on the basis of spectral distribution data of environmental light upon photographing and observation. Reference numeral 108 denotes a spectral reflectance converter for converting spectral distribution data for respective pixels of an image, which is photographed under photographing environmental light, of an object on the basis of the environmental light conversion data generated by the environmental light conversion data generator 107, thus obtaining spectral distribution data for reproducing the original color of the object. Reference numeral 109 denotes a colorimetric data converter for converting object spectral distribution data for respective pixels converted by the spectral reflectance converter 108 into colorimetric data for an output unit 105. The colorimetric data converted by this signal processor 103 are output to the output unit 105, and are displayed or printed.

The functional arrangement and operation of the image processing apparatus according to the first embodiment of the present invention will be described in more detail below with reference to FIGS. 2 and 3.

Figure 3:
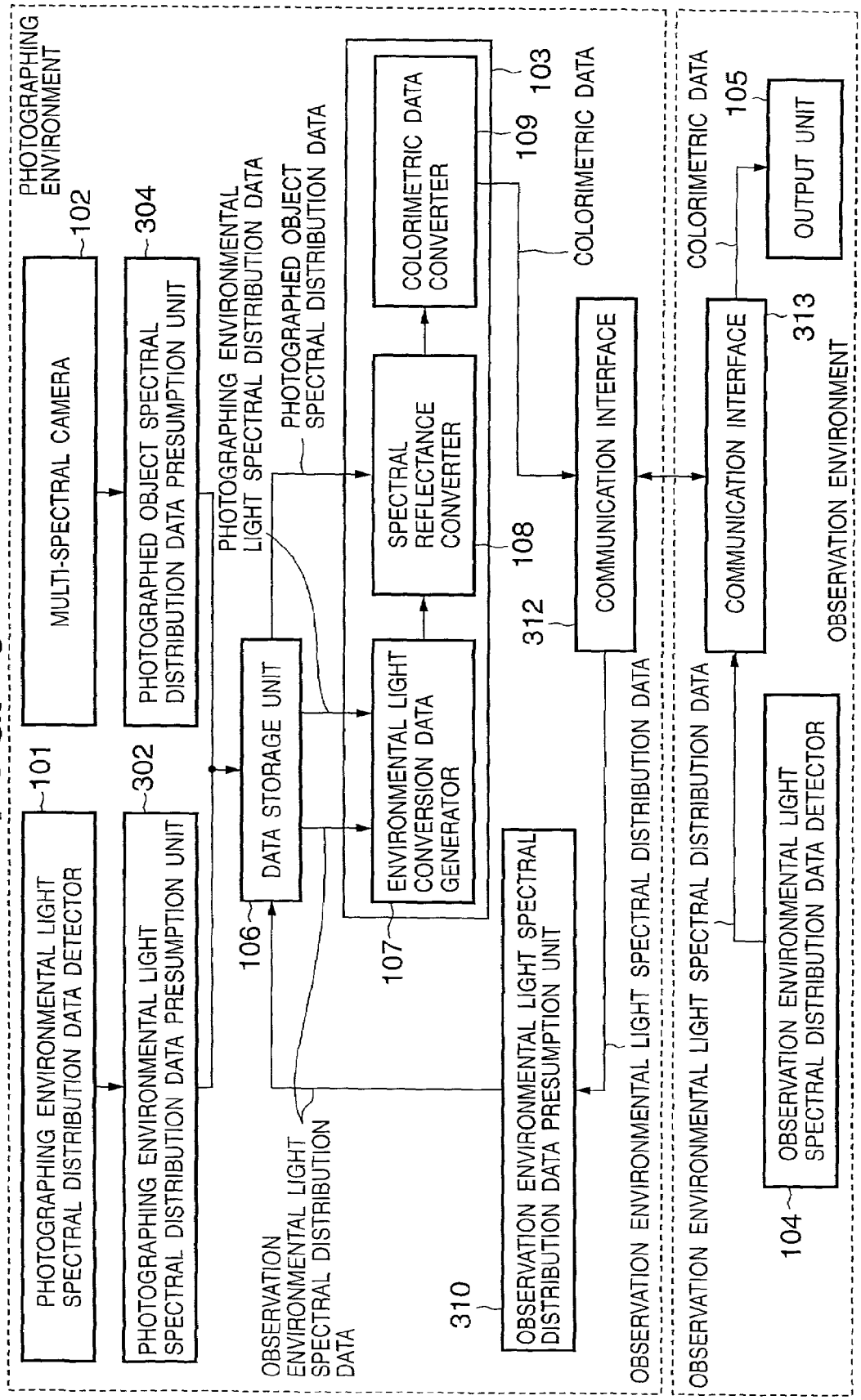
FIG. 3 is a block diagram showing the arrangement of an image processing system according to the first embodiment of the present invention.

FIG. 3 is a block diagram mainly showing the arrangement of the image processing apparatus according to the first embodiment of the present invention. The same reference numerals in FIG. 3 denotes the same parts as in FIG. 1 above, and a detailed description thereof will be omitted. In this case, a photographing apparatus, and an image processing apparatus (processors including the signal processor as a main unit) for processing an image signal photographed by the photographing apparatus are set under identical environmental light, and an image output apparatus for outputting an image is set under another environmental light.

Referring to FIG. 3, a photographing apparatus such as a camera or the like has at least a multi-spectral camera 102 and photographing environmental light spectral distribution data detector 101. An image processing apparatus has the aforementioned photographing apparatus, data storage unit 106, and signal processor 103. An image output apparatus comprises at least an output unit 105 for outputting an image under an observation environment, which is clearly different from the photographing environment in an arbitrary state that is away or spatially separated from the photographing environment, and is connected to the aforementioned image processing apparatus. The image output apparatus has the externally connected or built-in observation environmental light spectral distribution data detector 104.

The image processing apparatus and image output apparatus are connected via communication interfaces 312 and 313 to allow two-way data communications.

As will be described in detail later, the image processing apparatus preferably has a photographing environmental light spectral distribution data presumption unit 302 for presuming spectral distribution data of photographing environmental light when spectral distribution data detected by the photographing environmental light spectral distribution data detector 101 are band information (a set of spectral distribution data corresponding to discrete wavelengths). Also, the image processing apparatus preferably has a photographing object spectral distribution data presumption unit 304 for presuming spectral distribution data of an object to be photographed when spectral distribution data photographed by the multi-spectral camera 102 are band information. Furthermore, the image processing apparatus preferably comprises an observation environmental light spectral distribution data presumption unit 310 for presuming observation environmental light spectral distribution data when spectral distribution data detected by the observation environmental light spectral distribution data detector 104 are band information. Spectral distribution data (those corresponding to successive wavelengths in a predetermined wavelength range) presumed and generated by these spectral distribution data presumption units 302, 304 and 310 are stored in the data storage unit 106. In the second and subsequent embodiments, a description of these spectral distribution data presumption units will be omitted. That is, these spectral distribution data presumption units may be omitted depending on the arrangements of the spectral distribution data detectors 101 and 104, and multi-spectral camera 102.

An outline of the image process using spectral distribution data according to the first embodiment in the image processing apparatus with the arrangement shown in FIG. 3 will be described below with reference to the flow chart in FIG. 2.

In step S201, in a photographing environment in which an object is illuminated with given environmental light, an image of the object is photographed by the multi-spectral camera 102, thus obtaining an image signal (spectral distribution data) corresponding to the photographed image. As a result, spectral distribution data $S0(\lambda) \cdot R(\lambda)$ as the products of spectral distribution data $S0(\lambda)$ of the photographing environmental light, and spectral distribution data $R(\lambda)$ for respective pixels of the object image are obtained.

The flow then advances to step S202, and the photographing environmental light spectral distribution data detector 101 detects spectral distribution data of environmental light in the photographing environment of the multi-spectral camera 102, thus obtaining spectral distribution data $S0(\lambda)$ of environmental light upon the photographing. Note that the spectral distribution data $S0(\lambda)$ of environmental light upon the photographing may be obtained from the result obtained by photographing light reflected by a standard white plate illuminated with environmental light upon photographing by the multi-spectral camera 102.

The flow then advances to step S203 to obtain spectral distribution data $S1(\lambda)$ of observation environmental light in an observation environment which is highly likely to be different from the photographing environment. These data are obtained based on the detection result from the observation environmental light spectral distribution data detector 104. The spectral distribution data $S1(\lambda)$ of observation environmental light may be detected not only by the observation environmental light spectral distribution data detector 104 but based on the result obtained by photographing a standard white plate illuminated with observation environmental light by another multi-spectral camera or the like. The acquired spectral distribution data $S1(\lambda)$ of observation environmental light are sent to the image processing apparatus via the communication interfaces 313 and 312.

Note that the spectral distribution data $S1(\lambda)$ of observation environmental light may be compressed by a compression processor (not shown), and the compressed data may be sent via the communication interfaces 312 and 313. In this case, the image processing apparatus may store the received data in the data storage unit 106 as compressed data or after being decompressed by a data decompression unit (not shown).

The flow advances to step S204 to acquire spectral distribution data $S0(\lambda) \cdot R(\lambda)$ of the object for respective pixels from the image signal photographed by the multi-spectral camera 102. The spectral distribution data $S0(\lambda) \cdot R(\lambda)$ of the object and the spectral distribution data $S0(\lambda)$ of environmental light input to the image processing apparatus are stored and saved in the data storage unit 106 in the signal processor 103.

The flow advances to step S205 to define environmental light conversion data $Tr(\lambda)$ as:

$$Tr(\lambda) = S1(\lambda)/S0(\lambda) \qquad (1)$$

to obtain the spectral reflectance of the image of the object on the basis of the spectral distribution data $S0(\lambda)$ of photographing environmental light, and the spectral distribution data $S1(\lambda)$ of observation environmental light used to observe an image output based on the image signal.

The environmental light conversion data $Tr(\lambda)$ are calculated by the environmental light conversion data generator 107.

The flow advances to step S206 to obtain spectral reflectance values $S1(\lambda) \cdot R(\lambda)$ for respective pixels of the image of the object illuminated with observation environmental light by multiplying the spectral distribution data $S0(\lambda) \cdot R(\lambda)$ stored in the data storage unit 106 by the environmental light conversion data $Tr(\lambda)$ obtained in step S205. This reflectance is calculated in the spectral reflectance converter 108 by:

$$S1(\lambda) \cdot R(\lambda) = Tr(\lambda) \cdot S0(\lambda) \cdot R(\lambda) \qquad (2)$$

The flow then advances to step S207 to integrate the spectral distribution data $S1(\lambda) \cdot R(\lambda)$ for respective pixels of the image of the object under the spectral distribution data S1(λ) of observation environmental light obtained in step S206 by the convolution arithmetic operations of a color matching function in an appropriately selected colorimetric system by the colorimetric data converter 109, thus converting the data into colorimetric vector data having three values. In general, device independent values of, e.g., an L*a*b* colorimetric system, XYZ colorimetric system, or the like are selected as colorimetric vector data having three values. The converted colorimetric vector data of the XYZ colorimetric system having three values are sent to the output unit 105 of the image output apparatus via the communication interfaces 312 and 313.

Figure 4:
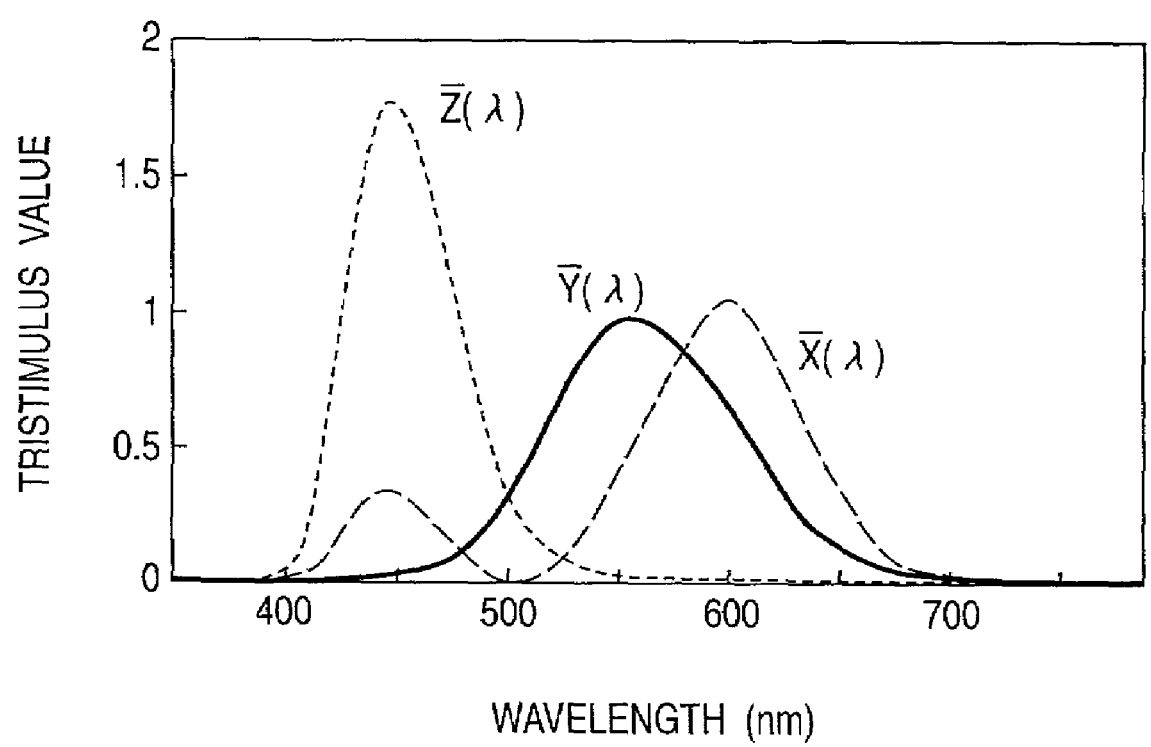
FIG. 4 is a graph showing an example of a color matching function.

FIG. 4 is a graph for explaining the color matching function in the XYZ colorimetric system as an example of a color matching function. As shown in FIG. 4, colorimetric vector data of the XYZ colorimetric system have different stimulus values in correspondence with different wavelengths.

The flow advances to step S208 to convert the colorimetric vector data having three values which are converted from the spectral distribution data S1(λ)·R(λ) and are sent to the output unit 105 in step S207 into an optimal output signal to observation environmental light in the output unit 105 of the image output apparatus. The image output apparatus includes a display using R, G and B signals values, a printer using C, M, Y and K signals, or a display or printer which use multi-color signal values more than R, G and B or C, M, Y and K. Such image output apparatus includes a CMS (color management) function or the like for achieving appropriate color specification of three colorimetric vector values in the output unit 105 in consideration of the output characteristics of the output unit 105. Colorimetric data are converted in step S207 into an optimal output signal to observation environmental light in the output unit 105 with reference to such CMS function.

The flow advances to step S209 to output the output signal generated in step S208 to the output unit 105, thus outputting an image.

Figure 2:
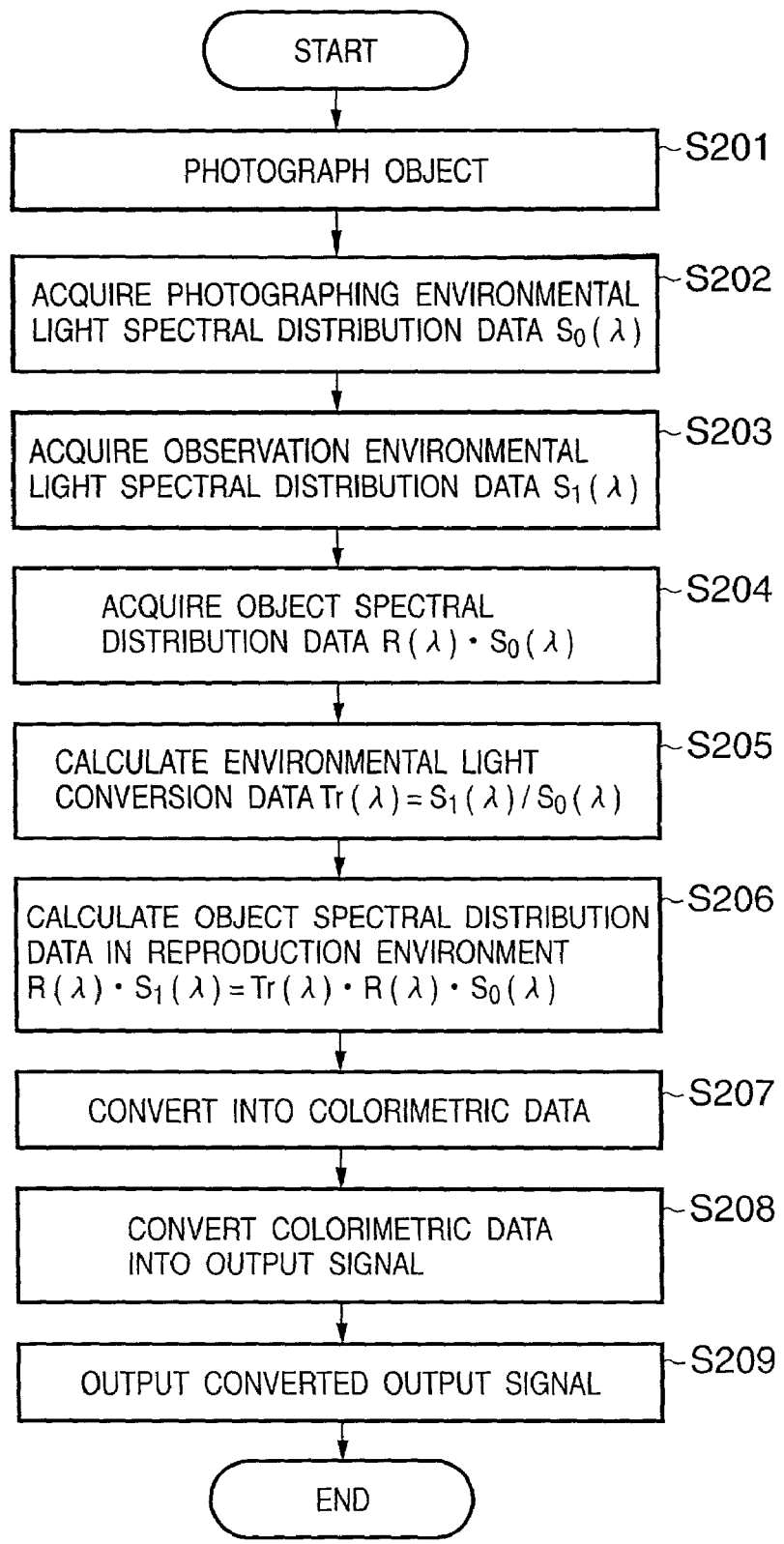
FIG. 2 is a flow chart showing the flow of an image process according to the embodiment of the present invention.

The output result from the output unit 105 of image data generated in the respective steps shown in the flow chart of FIG. 2 is an image with a color specification projected to be obtained when an object photographed under photographing environmental light is observed under different observation environmental light.

The respective steps of FIG. 2 of this embodiment will be described in more detail below.

Figure 5:
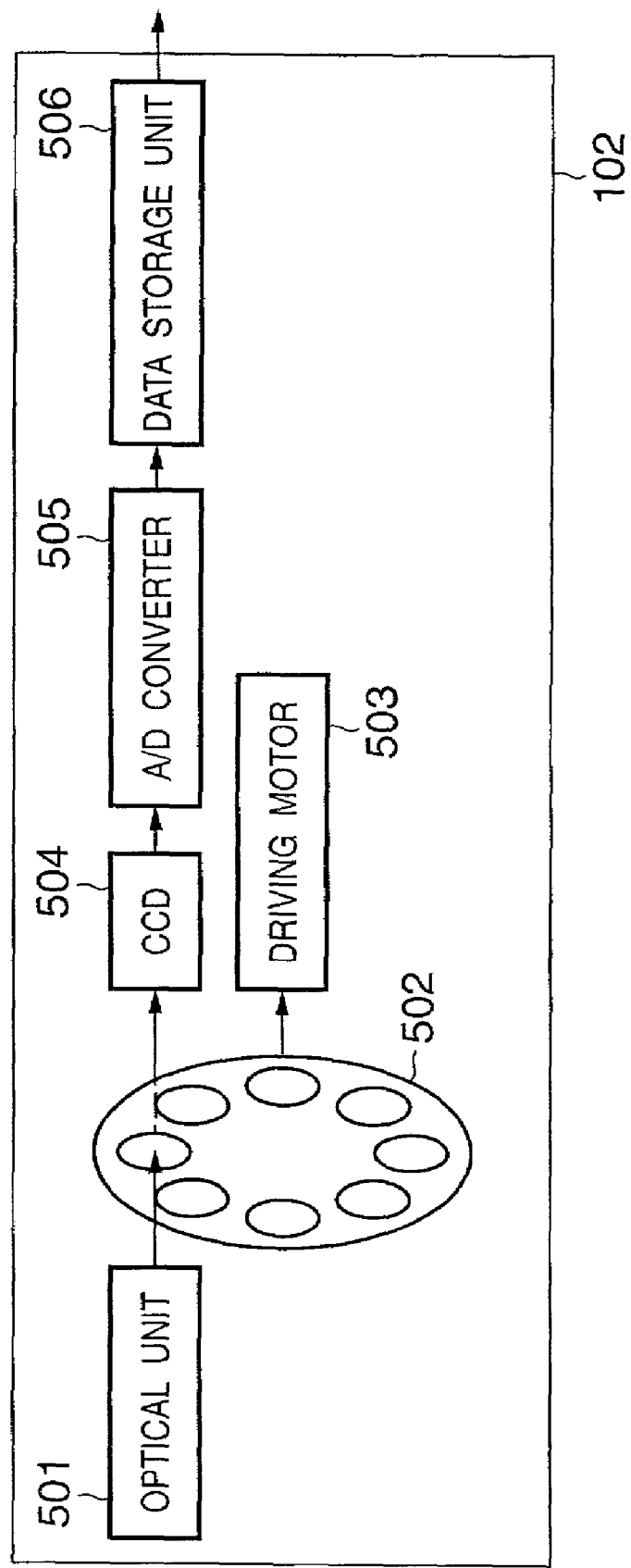
FIG. 5 is a block diagram showing an example of the arrangement of a multi-spectral camera according to the first embodiment.

FIG. 5 is a block diagram showing an example of the multi-spectral camera 102 as a photographing apparatus of this embodiment.

Referring to FIG. 5, reference numeral 501 denotes an optical unit including a lens, iris, and the like. Reference numeral 502 denotes a rotary filter on which a plurality of filters having spectral characteristics of different wavelengths are laid out along the perimeter of a disk in the order of wavelengths corresponding to respective bands, as shown in FIG. 5. With this arrangement, light coming from an object passes through the optical unit 501, and is input toga CCD 504 via one filter of the rotary filter 502. In this way, data output from the CCD 504 becomes band information (data according to a separated wavelength) in accordance with the wavelength of each filter. When the rotary filter 502 is rotated by a driving motor 503 to switch a filter located to face the CCD sensor 504, a plurality of pieces of band information corresponding to respective wavelengths are obtained. These pieces of obtained band information are output from the CCD sensor 504, and are converted into digital signals by an A/D converter 505. These digital signals are stored in a data storage unit 506 as digital data representing respective pixels.

Since the processing time required for sampling can be shortened with decreasing number of filters on the rotary filter 502, high-speed photographing is assured. Hence, the number of filters corresponding to bands is minimized.

Figure 6:
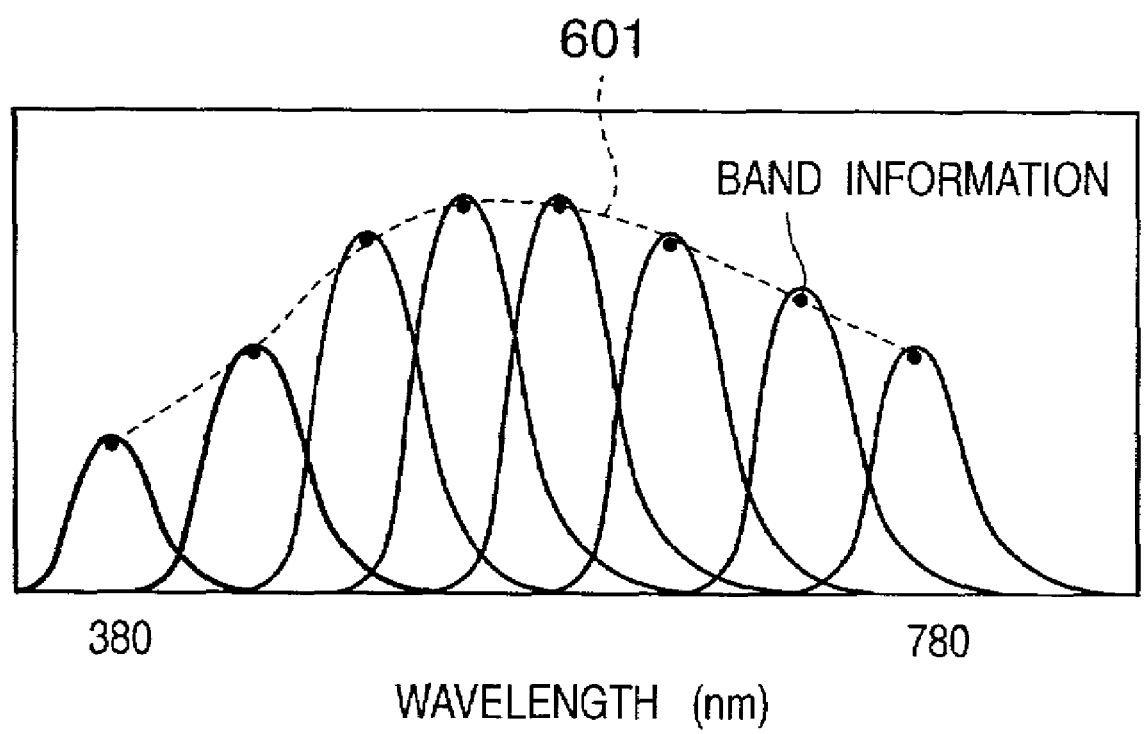
FIG. 6 is a graph showing band information obtained by the multi-spectral camera of the first embodiment via a filter.

Since spectral distribution data acquired by such multi-spectral camera 102 are information for respective bands decomposed based on the wavelengths acquired in correspondence with the filters, as shown in FIG. 6, they cannot be used as spectral distribution data over the full wavelength range as they are. Spectral distribution data over the full wavelength range will be referred to as multi-spectral distribution data in contrast to band information in a limited wavelength range acquired by the multi-spectral camera 102 according to this embodiment. Therefore, means for acquiring multi-spectral distribution data by executing an interpolation process of the spectral distribution data for respective bands, which are sampled by the multi-spectral camera 102 of this embodiment, is required.

In this embodiment, in output wavelength data for respective bands, which are obtained from the rotary filter 502, the intermediate values of respective wavelength data are defined as band information, as shown in FIG. 6, and multi-spectral distribution data are obtained by interpolating these pieces of band information, as indicated by a dotted curve 601.

The photographing object spectral distribution data presumption unit 304 in FIG. 3 is arranged in the photographing apparatus such as a camera or the like, or the image processing apparatus, and generates multi-spectral distribution data used in the image processing apparatus on the basis of band data input as information for respective bands.

The photographing object spectral distribution data presumption unit 304 may execute a batch process for each band information photographed by the multi-spectral camera 102, and may output multi-spectral distribution data obtained by interpolation as spectral distribution data of the multi-spectral camera 102. Alternatively, it may execute an estimation process of each band information input from the multi-spectral camera 102 by interpolation in the image processing apparatus, and may store the estimated multi-spectral distribution data in the data storage unit of the image processing apparatus as spectral distribution data.

In the arrangement according to this embodiment, when spectral distribution data of environmental light detected by the photographing environmental light spectral distribution data detector 101 and observation environmental light spectral distribution data detector 104 for detecting spectral distribution data of environmental light are band information corresponding to the limited wavelength range, the image processing apparatus preferably comprises the photographing environmental light spectral distribution data presumption unit 302 and observation environmental light spectral distribution data presumption unit 310 for presuming spectral distribution data of environmental light upon photographing and observation.

In this embodiment, since spectral distribution data is defined as band information having a plurality of values for conventional three signal values such as R, G and B values, it has a large data size per pixel.

Hence, upon sending multi-spectral distribution data or band information corresponding to spectral distribution data from the photographing environmental light spectral distribution detector 101 and multi-spectral camera 102 to the image processing apparatus, a data compression unit (not shown in FIG. 3) for compressing multi-spectral distribution data or band information corresponding to spectral distribution data is provided, and data to be sent is compressed using the data compression unit to send the compressed data, thus shortening the time required for data transfer. In this case, the image processing apparatus comprises a data decompression unit (not shown), receives the sent data, and stores the received image data in the data storage unit 106 as the compressed data or decompressed data by the data decompression unit.

An example of a process for compressing spectral distribution data or band information will be explained below.

Figure 7:
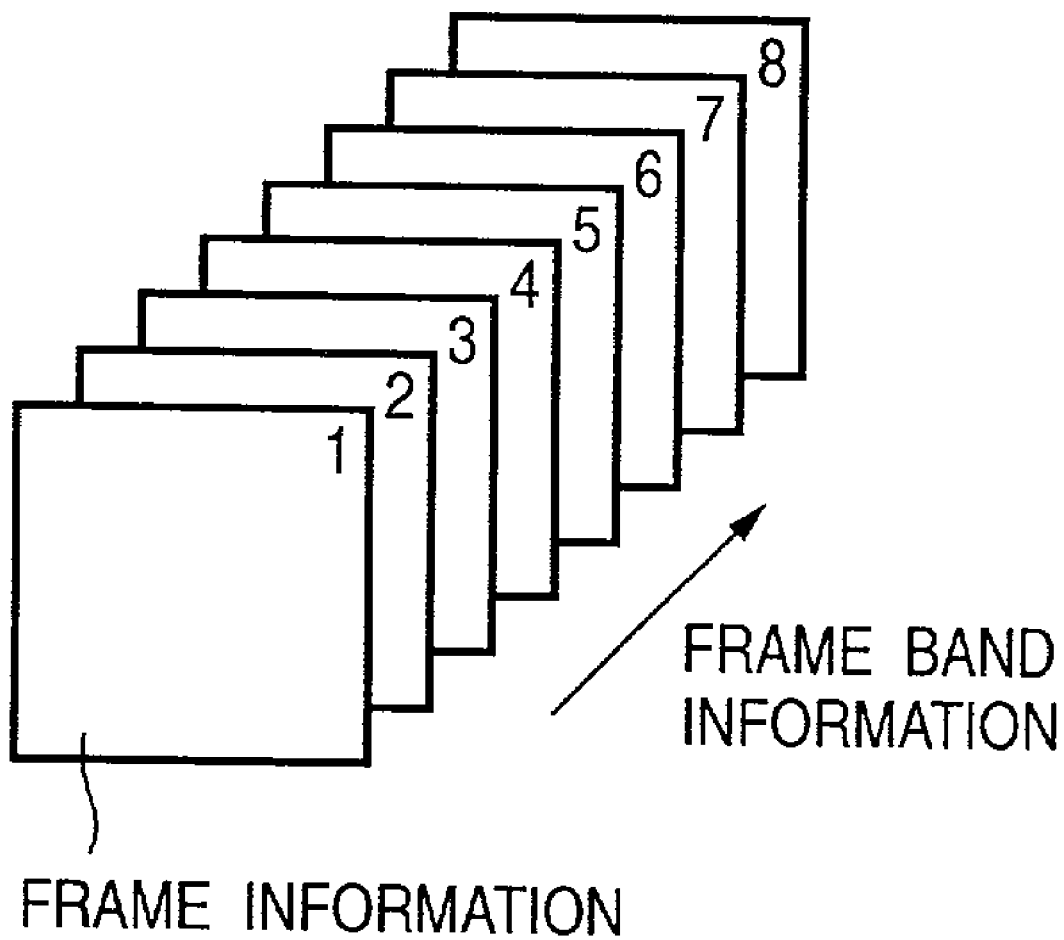
FIG. 7 is a view for explaining a compression process of spectral distribution data.

FIG. 7 shows an arrangement of respective pieces of frame band information along with an elapse of time when eight filters are set on the rotary filter 502 of the multi-spectral camera 102 of this embodiment.

Since the multi-spectral camera 102 of this embodiment acquires band information for each pixel of a wavelength via one filter by rotating the rotary filter 502, one frame band information can be acquired per each filter. When the rotary filter 502 is rotated to sequentially switch the filters, and photographing processes are made using all the filters, a plurality of pieces of frame band information corresponding to the number of filters provided to the rotary filter 502 can be acquired.

Figure 8:
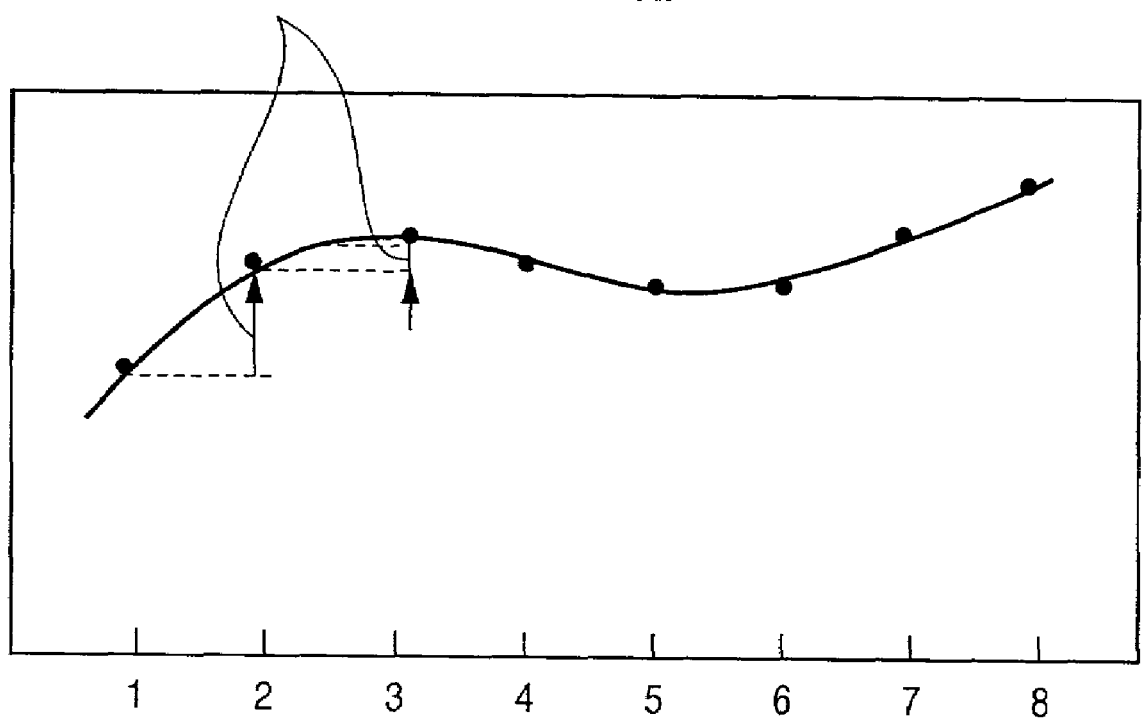
FIG. 8 is a view for explaining a compression process of spectral distribution data.

As shown in FIG. 8, band information of a pixel of interest for each frame is used, and the differences between pairs of neighboring frame band information are calculated, thus extracting correlation information between them. In band information for one frame, differences between pixels are calculated to extract correlation information between them in band information for one frame.

In this way, by making optimal encoding based on correlation information between pairs of neighboring frame band information and correlation information between pixels in band information for one frame, spectral distribution data can be efficiently compressed.

As for compression of spectral distribution data of environmental light upon photographing and observation, frame band information is not always required, and band information corresponding to each filter need only be used, compared to spectral distribution data of an image photographed by the multi-spectral camera 102. Hence, the photographing environmental light and observation environmental light spectral distribution data detectors 101 and 104 of this embodiment may output only band information corresponding to each filter. Alternatively, when the multi-spectral camera 102 photographs a standard white plate under given environmental light to detect spectral distribution data of the environmental light, band information corresponding to a filter at an arbitrary pixel position may be directly output as band information or the average value of some pieces of band information corresponding to respective filters at some arbitrary pixel positions may be output as band information.

By calculating the differences between pairs of neighboring band information corresponding to respective filters in spectral distribution data of environmental light upon photographing and observation, and making optimal encoding based on the correlation information between pairs of band information, spectral distribution data can be efficiently compressed.

The image processing apparatus may be implemented in the form of, e.g., a driver software of a host computer connected to the photographing apparatus, and spectral distribution data input to the host computer may be processed by the software and output to the image output apparatus. Alternatively, this image processing function may be installed in the photographing apparatus as firmware, and upon receiving spectral distribution data, the aforementioned image signal process may be executed by the image processing function in the photographing apparatus to convert the spectral distribution data into an output signal, and to send the output signal to the image output apparatus, thus outputting an image. Furthermore, this embodiment may be implemented as a program that executes the image processing method, or a storage medium that stores the program.

Since the latter arrangement does not require any intervention such as a PC or the like, and allows to directly connect the photographing apparatus and image output apparatus via an arbitrary communication means (cable, network, or the like), the image processing system can be easily built.

The signal processor 103 in the image processing apparatus shown in FIG. 3 comprises three signal processing units, i.e., the environmental light conversion data generator 107, spectral reflectance converter 108, and colorimetric data converter 109.

Figure 9:
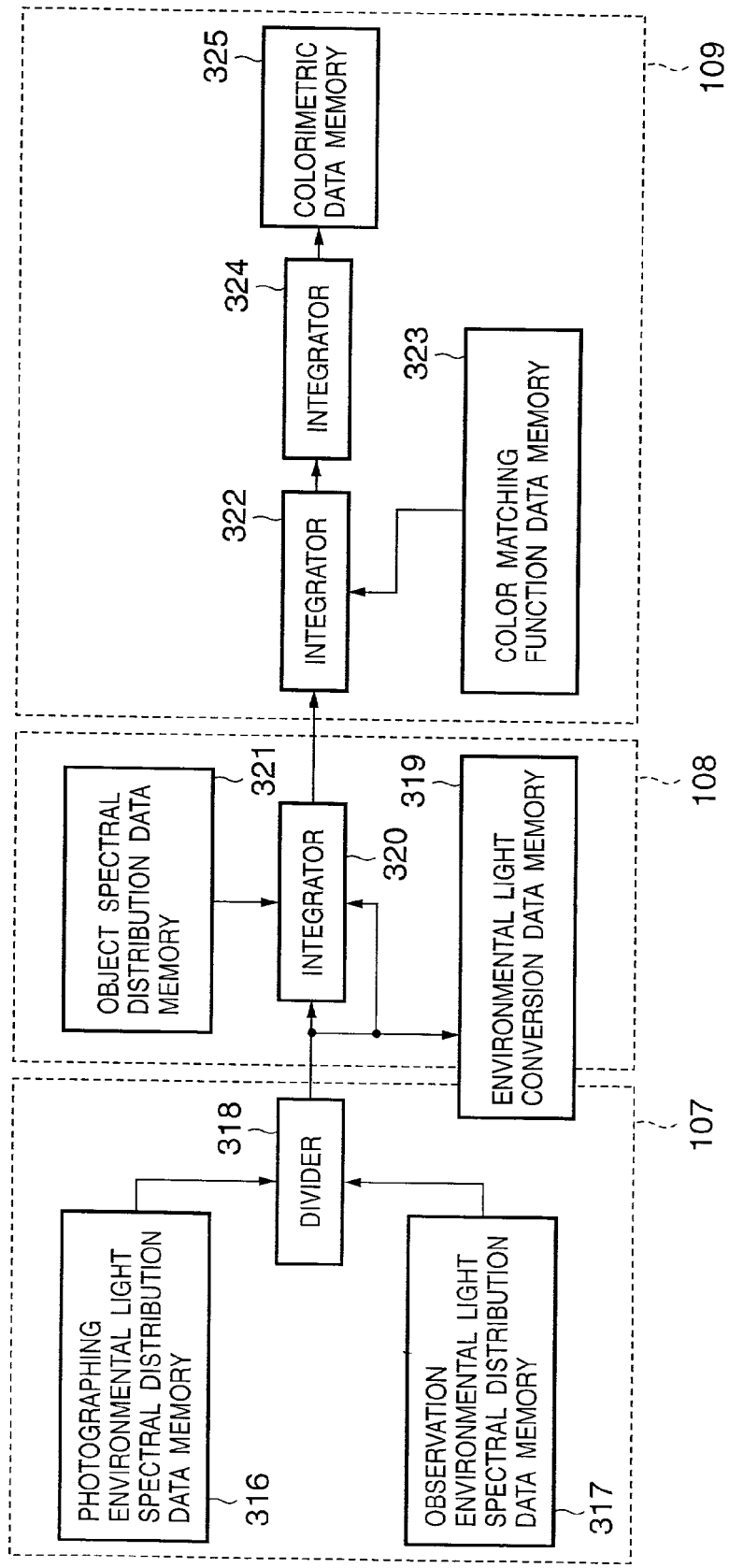
FIG. 9 is a block diagram showing the arrangement of a signal processor according to the first embodiment of the present invention.

FIG. 9 is a block diagram showing the detailed arrangement of these environmental light conversion data generator 107, spectral reflectance converter 108, and colorimetric data converter 109.

Referring to FIG. 9, memories 316, 317 and 321 that store spectral distribution data, and a color matching function data memory 323 receive data from the data storage unit 106 in the image processing apparatus.

In the environmental light conversion data generator 107, photographing environmental light spectral distribution data from the photographing environmental light spectral distribution data memory 316, and observation environmental light spectral distribution data from the observation environmental light spectral distribution data memory 317 are supplied to a divider 318. The divider 318 divides the photographing environmental light spectral distribution data by the observation environmental light spectral distribution data to obtain a ratio $(Tr(\lambda)=S1(\lambda)/S0(\lambda))$, and stores the quotient in an environmental light conversion data memory 319 as environmental light conversion data $(Tr(\lambda))$.

In the spectral reflectance converter 108, an integrator 320 multiplies spectral distribution data from the object spectral distribution data memory 321 that stores spectral distribution data of an image of an object photographed by the camera 102 by the environmental light conversion data from the environmental light conversion data memory 319, thus obtaining spectral reflectance $(S1(\lambda) \cdot R(\lambda))$ of the photographed object.

In the colorimetric data converter 109, an integrator 322 multiplies the output from the integrator 320 as the product of the spectral distribution data of the photographed object and the environmental light conversion data by a color matching function supplied from the color matching function data memory 323, and an integrator 324 makes convolution integral arithmetic operations of the product from the integrator 322 to calculate ternary colorimetric data. The calculation result is stored in a colorimetric data memory 325.

Figure 10:
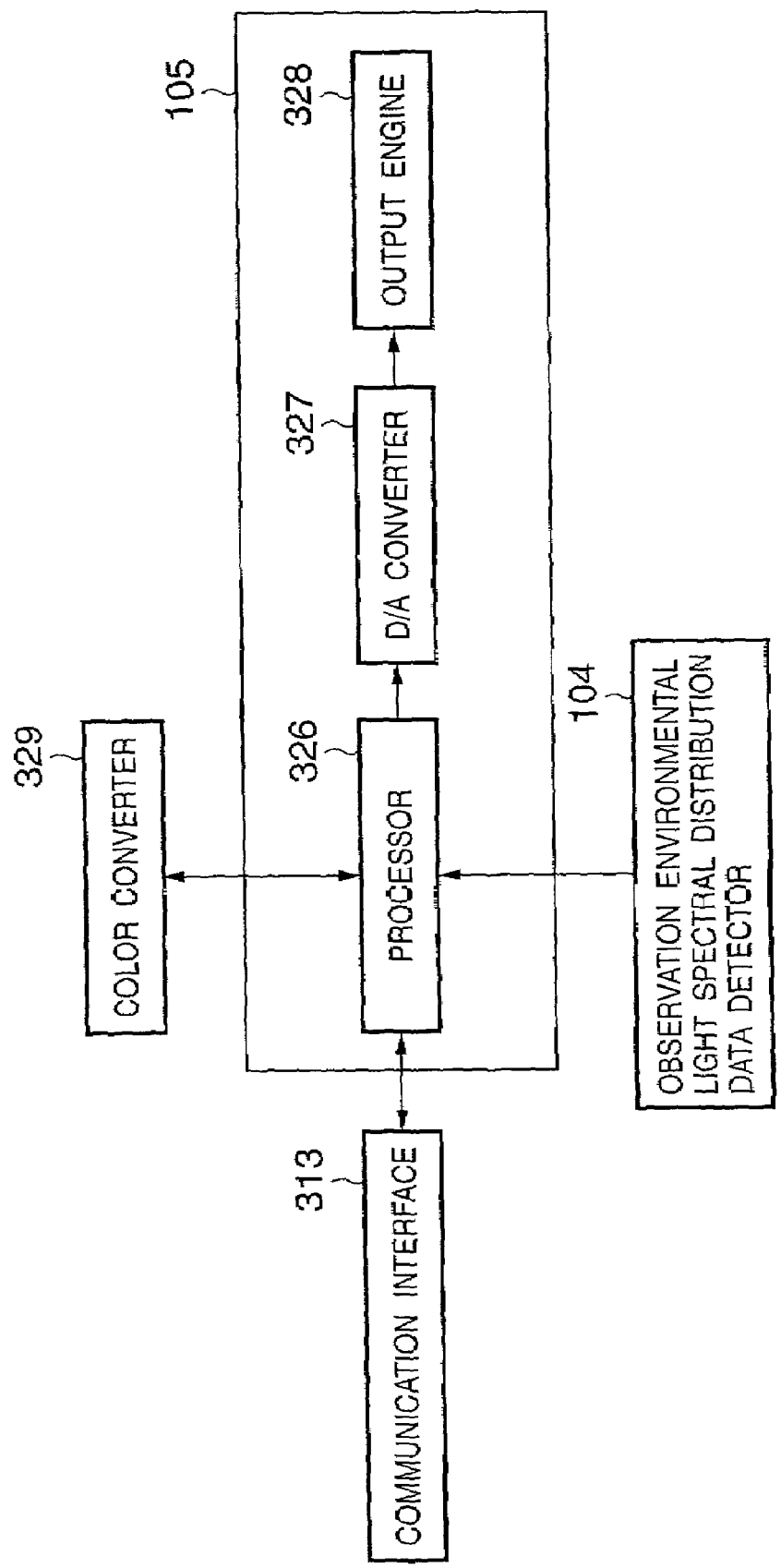
FIG. 10 is a block diagram showing the arrangement of an output apparatus according to the first embodiment of the present invention.

FIG. 10 is a block diagram showing the arrangement of the image output apparatus according to this embodiment.

Referring to FIG. 10, a processor 326 transfers spectral distribution data obtained by the observation environmental light spectral distribution data detector 104 to the image processing apparatus via the communication interfaces 313 and 312. On the other hand, the image processing apparatus transfers to the processor 326 of the image output apparatus, colorimetric data as three signal values (XYZ, Lab, or the like) in a color space unique to this output unit 105, and information required to change the color management system of the image output apparatus to a device profile under observation environmental light upon converting colorimetric data to an output signal to the output unit 105, via the communication interfaces 312 and 313.

The processor 326 generates an optimal output signal to the image output apparatus under the observation environmental light using a color converter 329 including the color management system for converting colorimetric data into an output signal value. This output signal is converted into an analog signal by a D/A converter 327, and the analog signal is output to an output engine 328.

Figure 11:
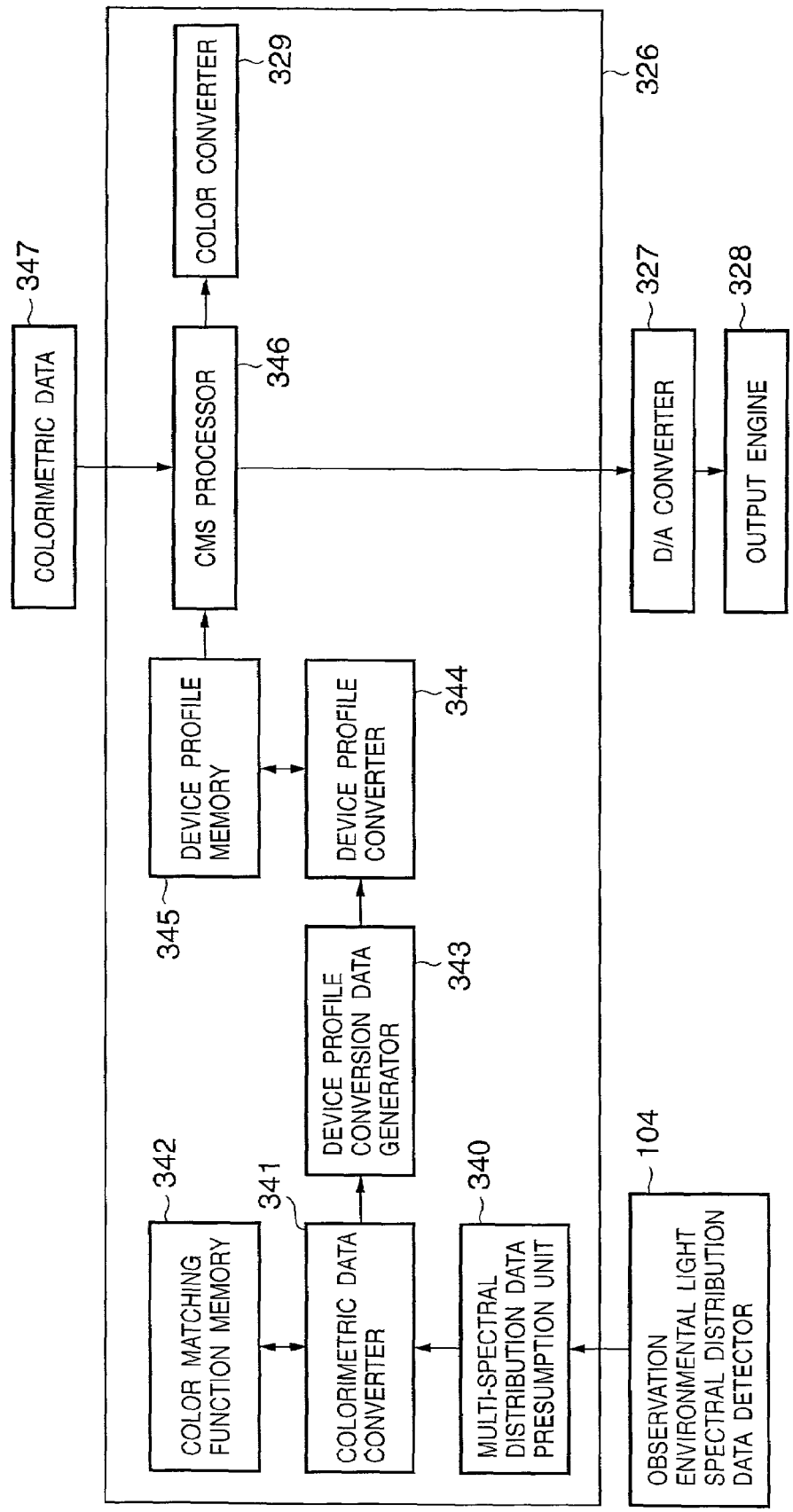
FIG. 11 is a block diagram showing a correction method of a color management system according to the first embodiment of the present invention.

FIG. 11 is a block diagram for explaining the process for changing the color management system used in the image output apparatus according to this embodiment into a device profile corresponding to observation environmental light.

According to the von Kries chromatic adaptation transformation, let (X, Y, Z) be tristimulus values of a given object color under first environmental light (experimental light), and (X', Y', Z') be those of corresponding color upon changing the environmental light to another one (reference light). Then, we have:

$$\begin{bmatrix} X' \\ Y' \\ Z' \end{bmatrix} = \begin{bmatrix} a11 & a12 & a13 \\ a21 & a22 & a23 \\ a31 & a32 & a33 \end{bmatrix} \begin{bmatrix} X \\ Y \\ Z \end{bmatrix} \quad (3)$$

where matrix elements aij are constants obtained from tristimulus values of experimental light and reference light.

When spectral distribution data of observation environmental light detected by the observation environmental light spectral distribution data detector 104 are band information, a multi-spectral distribution data estimation unit 340 converts these data into multi-spectral distribution data. A colorimetric data converter 341 acquires a color matching function of the XYZ colorimetric system from the color matching function memory 342, and converts environmental light spectral distribution data in the observation environment into X, Y and Z values. In this way, the X, Y and Z values of white under the observation environmental light can be obtained. Since these X, Y and Z values or color matching function are calculated and stored by the image processing apparatus on the photographing side, they may be acquired via the communication interfaces 312 and 313.

Furthermore, a device profile conversion data generator 343 acquires X, Y and Z data of white under the observation environmental light, and X, Y and Z values of white under a standard light source in the color management system installed in the image output apparatus from a device profile memory 345. By applying the von Kries chromatic adaptation transformation, the aforementioned matrix elements aij are calculated to convert the X, Y and Z values of the device profile that describes the characteristics of output color of the image output apparatus under the standard light source in the color matching system into those of object color in the observation environment.

A device profile converter 344 generates a device profile of the image output apparatus under the observation environmental light from the device profile based on the standard light source in the color management system installed in the image output apparatus on the basis of the calculated matrix elements aij. The generated device profile is stored in the device profile memory 345 as a device profile under the environmental light.

As described above, upon receiving colorimetric data 347 as spectral distribution data of the photographed object, which are converted based on photographing environmental light, the color converter 329 and a CMS processor 346 obtain an output signal optimized according to the observation environmental light using the aforementioned profile under the observation environmental light. The output signal is converted into an analog signal by the D/A converter 327, and the analog signal is sent to the output engine 328, thus outputting an image. In this fashion, accurate color specification according to the original object color can be realized under the observation environmental light.

In the image processing apparatus according to the first embodiment, since the color specification of an object which is photographed upon being illuminated with given environmental light is accurately reproduced using spectral distribution data, an image of the object can be reproduced even in an observation environment under environmental light different from the given environmental light to have a color specification obtained when the object is placed under the observation environmental light.

Since spectral distribution data of environmental light upon photographing and observation are acquired, a device profile under a standard light source, which is installed in the color management system of the image output apparatus can be converted into a device profile under the environmental light, thus realizing color reproducibility in the image output apparatus.

Second Embodiment

Figure 12:
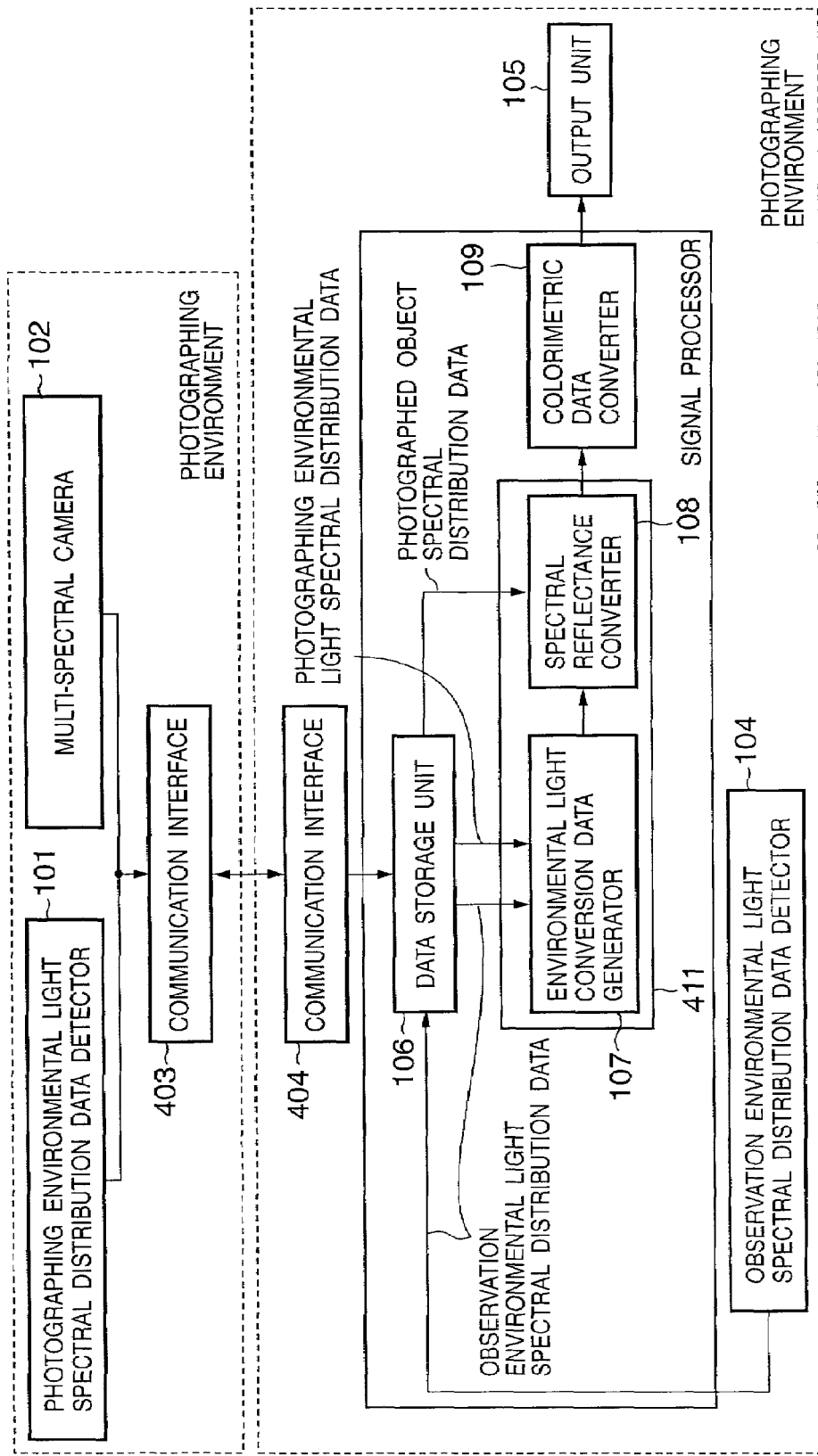
FIG. 12 is a block diagram showing an example of the arrangement of an image processing system according to the second embodiment of the present invention.

FIG. 12 is a block diagram showing the arrangement of an image processing apparatus according to the second embodiment of the present invention, and shows an example of the arrangement when photographing environmental light by a photographing apparatus (camera) is different from observation environmental light of an image processor and image output unit that reproduces an image based on an image signal from the camera. Note that the same reference numerals in FIG. 12 denote the same parts as in the first embodiment, and a detailed description thereof will be omitted.

That is, the image processing apparatus comprises an image processor (processors including a signal processor 411 and the like as a main unit) and output apparatus, that are placed under observation environmental light, which is highly likely to be different from photographing environmental light under which a photographing apparatus which comprises at least a multi-spectral camera 102 and photographing environmental light spectral distribution data detector 101 is placed.

The image processor and output apparatus comprise at least a data storage unit 106, a signal processor 411, an output unit 105 for outputting an image, and an observation environmental light spectral distribution data detector 104. Note that the photographing apparatus, and the image processor and output apparatus are connected by arbitrary communication means via communication interfaces 403 and 404 provided to the respective apparatuses so as to allow bidirectional data communications.

In the arrangement according to the second embodiment, since the image processor is placed on the observation environment side, the photographing apparatus comprises at least the multi-spectral camera 102 for photographing an image of an object, the photographing environmental light spectral distribution data detector 101 for detecting spectral distribution data of photographing environmental light, and the communication interface 403 for transferring spectral distribution data to the image processing apparatus placed in the observation environment. As a result, since weight and size reductions of the photographing apparatus can be achieved, even when there are a plurality of photographing environments and it is hard to transport a photographing apparatus integrated with the function of the image processing apparatus to respective photographing locations, such case can be easily coped with.

In the second embodiment, since at least two or more spectral distribution data, i.e., spectral distribution data of the photographed object, and those of photographing environmental light must be transferred, a spectral distribution data compression/decompression device used to efficiently transfer spectral distribution data may be equipped in the communication interfaces 403 and 404.

When spectral distribution data detected or photographed by the multi-spectral camera 102 and photographing environmental light spectral distribution data detector 101 are not multi-spectral distribution information but the aforementioned band information, the data storage unit 106 may comprise the aforementioned spectral distribution data estimation unit to interpolate the band information to obtain multi-spectral distribution data, and may store the interpolated multi-spectral distribution data.

The image process according to the second embodiment may be stored in the form of driver software in, e.g., a host computer connected to the image output apparatus, and spectral distribution data input to the host computer may undergo an image process to output the processed data as an output signal to the image output apparatus. Alternatively, the image process may be installed as firmware in the image output apparatus, which receives spectral distribution data, and executes an image process of the data to convert the processed data into an output signal, thus outputting an image. Furthermore, this embodiment may be implemented as a recording medium that stores such software.

Third Embodiment

Figure 13:
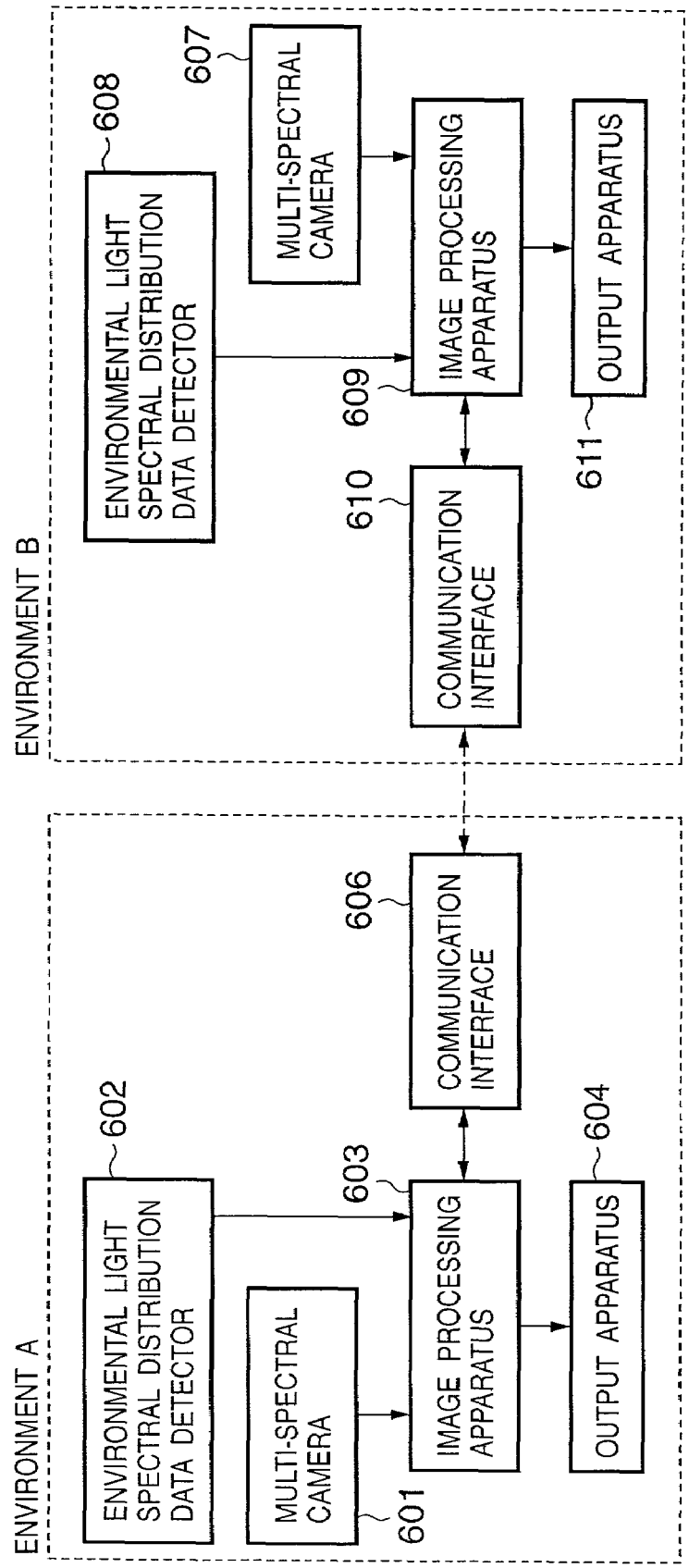
FIG. 13 is a block diagram showing an example of the arrangement according to the third embodiment of the present invention.

In the second embodiment, clear environmental conditions, i.e., photographing and observation environments are set, and the photographing apparatus and image output apparatus are provided in these environments. In the third embodiment, no environments, i.e., photographing and observation environments are defined, and a system of this embodiment comprises a multi-spectral camera 601, environmental light spectral distribution data detector 602, image processing apparatus 603, communication interface 606, and output apparatus 604, which are placed in environment A (environmental light A), and also comprises a multi-spectral camera 607, environmental light spectral distribution data detector 608, image processing apparatus 609, communication interface 610, and output apparatus 611, which are placed in another environment B (environmental light B), as shown in FIG. 13. Image data of objects photographed under different types of environmental light can be exchanged by bidirectional communications via the communication interfaces 606 and 610, and the output apparatuses 604 and 611 can accurately reproduce under their environmental light the color specifications of the object images, which are photographed under different types of environmental light. Since the basic principle of this embodiment is the same as that in the above embodiments, a detailed description thereof will be omitted.

In an image processing apparatus placed under given environmental light, whether objective environmental light of image data which is to undergo an image process becomes photographing or observation environmental light is uniquely defined by whether image data photographed under the environmental light is acquired and processed or image data of an object photographed under another environmental light is processed and reproduced. In this way, the image processing apparatus can appropriately reproduce the color specification of an object by applying the signal processing method described in the above embodiments.

Note that environmental light based on which an arithmetic process in the image processing apparatus is done may be determined depending on the processing performance of the image processing apparatus such as the image processing speed, memory size, and the like, the data transfer rate in communication means, user's instruction, and the like.

Fourth Embodiment

Figure 14:
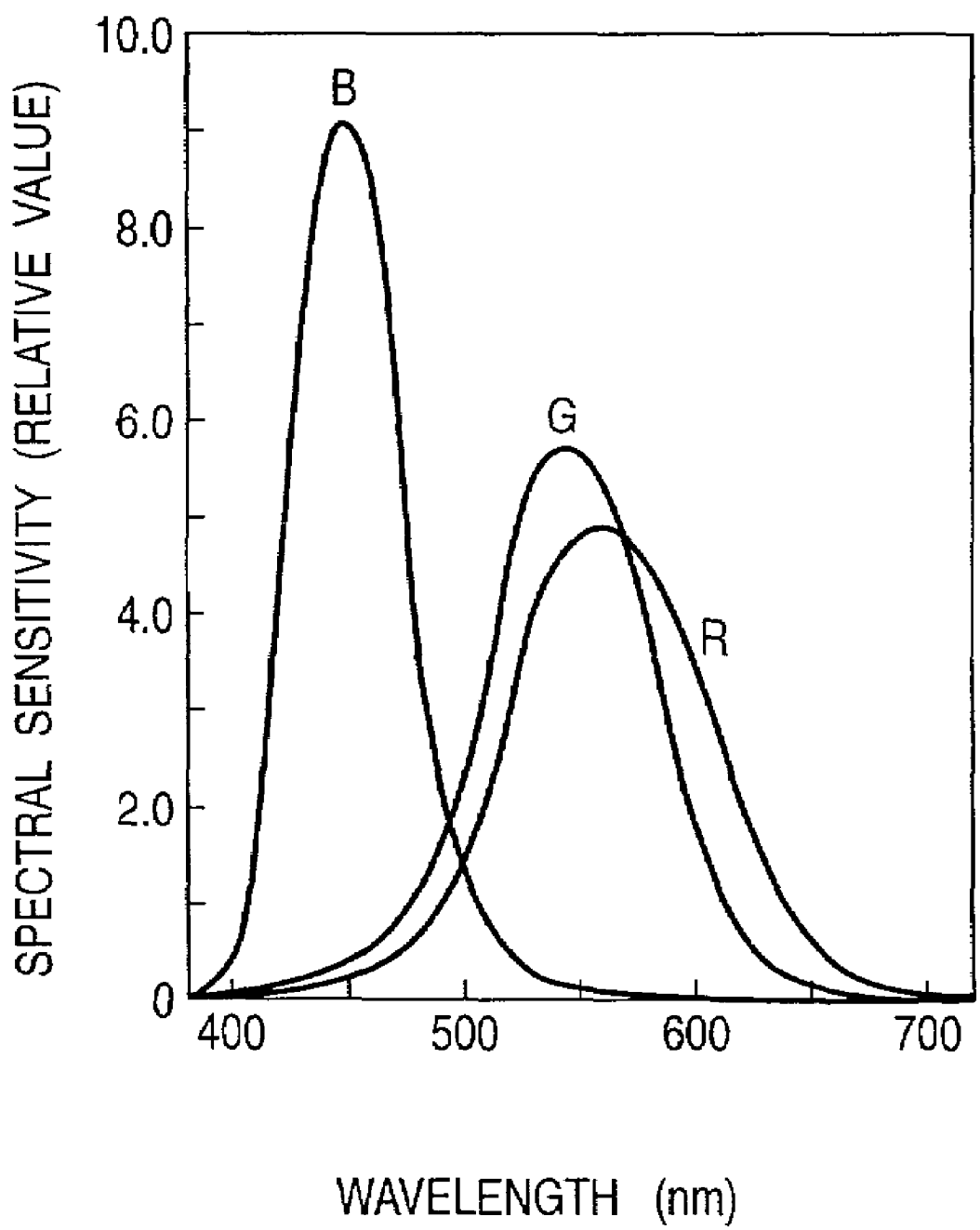
FIG. 14 shows an example of R, G and B filter characteristics in a spectrum camera.

FIG. 14 is a graph showing R, G and B spectral characteristics.

In the above embodiments, spectral distribution data as band information output from the multi-spectral camera 102, 601 or 607, or spectral distribution data of environmental light as band information detected by the environmental light spectral distribution data detector 101, 602 or 603 are output values corresponding to respective wavelengths, as shown in FIG. 6 above. In the fourth embodiment, output values corresponding to a plurality of arbitrary wavelengths that indicate spectral distribution data may have R, G and B spectral characteristics, as shown in FIG. 14. Note that data may directly have R, G and B values in place of the R, G and B spectral characteristic data.

Fifth Embodiment

In the above embodiments, the multi-spectral camera comprises a rotary filter, and outputs spectral distribution data corresponding to the wavelengths of the respective filters. A multi-spectral camera according to the fifth embodiment is not limited to this. For example, a multi-spectral camera which comprises an area sensor with filters having high sensitivities to a plurality of wavelengths of light may be used.

Or a multi-spectral camera which comprises a line sensor that selectively uses light source data of a plurality of specific wavelengths or selectively uses filters having high sensitivities to a plurality of wavelengths may be used. That is, the optical arrangement of the camera of the fifth embodiment is not particularly limited as long as it is a spectral camera for acquiring spectral distribution data corresponding to respective wavelengths.

Sixth Embodiment

In the sixth embodiment, after environmental light conversion data is generated in step S205 in the flow chart of FIG. 2, the environmental light conversion data is stored in the data storage unit 106 of the image processing apparatus, and is updated only when either photographing or observation environmental light has changed.

Figure 15:
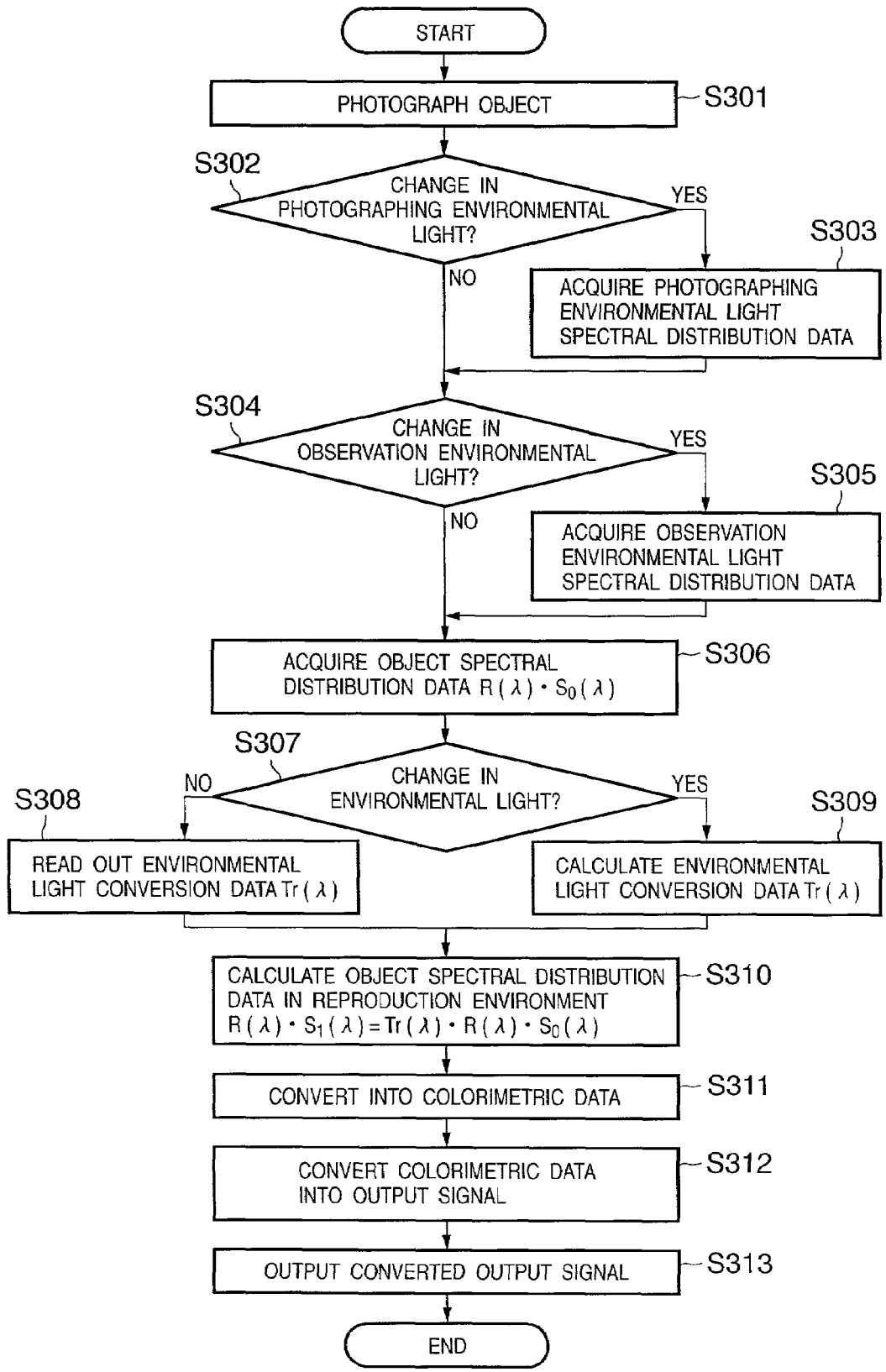
FIG. 15 is a flow chart showing the flow of processes in an image processing system according to the sixth embodiment of the present invention.

FIG. 15 is a flow chart showing the process according to the sixth embodiment. Note that the apparatus arrangement in this case is the same as that in the first embodiment (FIGS. 1 and 3), and a description thereof will be omitted.

In step S301, an image of an object is photographed by the spectral camera 102. The flow advances to step S302 to check if spectral distribution data of photographing environmental light by the spectral camera 102, which are indicated by detection data from the photographing environmental light spectral distribution data detector 101, have changed from those (stored in the data storage unit 106) obtained at the previous photographing timing. If YES in step S302, the flow advances to step S303 to store the spectral distribution data from the photographing environmental light spectral distribution data detector 101 in the data storage unit 106 as new photographing environmental light spectral distribution data. The flow then advances to step S304.

If it is determined in step S302 that the spectral distribution data from the photographing environmental light spectral distribution data detector 101 have not changed, or no change in spectral distribution data of photographing environmental light is detected due to a photographing time interval, user's instruction, or the like, the flow advances to step S304 to check if spectral distribution data from the observation environmental light spectral distribution data detector 104 have changed from those already stored in the data storage unit 106. If YES (changed) in step S304, the flow advances to step S305 to store the spectral distribution data from the observation environmental light spectral distribution data detector 104 in the data storage unit 106 as new spectral distribution data of observation environmental light. The flow then advances to step S306.

On the other hand, if it is determined in step S304 that the spectral distribution data from the observation environmental light spectral distribution data detector 104 have not changed, or no change in spectral distribution data of observation environmental light is detected due to a photographing time interval, user's instruction, or the like, the flow advances to step S306 to read out and acquire spectral distribution data of an object under the photographing environmental light of that object from the data storage unit 106.

The flow advances to step S307 to check based on the presence/absence of changes in environmental light spectral distribution data in steps S302 and S304 if either the photographing or observation environmental light has changed. If YES in step S307, the flow advances to step S309 to re-calculate environmental light conversion data Tr($\lambda$) of the object on the basis of the spectral distribution data of environmental light in the photographing environment and/or the observation environment, which are/is saved in step S303 and/or step S305.

If it is determined in step S307 that neither spectral distribution data of environmental light have changed, the flow advances to step S308 to read out environmental light conversion data Tr($\lambda$) pre-stored in the data storage unit 106.

After step S308 or S309 is executed in this way, the flow advances to step S310, and the spectral reflectance converter 108 executes a conversion process based on environmental light of spectral distribution data of the object photographed by the multi-spectral camera 102 using the environmental light conversion data Tr($\lambda$) acquired in step S308 or S309. The flow then advances to step S311 to execute conversion into colorimetric data. The flow advances to step S312 to convert the colorimetric data into an output signal corresponding to the output unit 105 of the image output apparatus. In step S313, the output signal is output to the output unit 105.

According to the sixth embodiment, when no change in environmental light is detected upon, e.g., executing continuous photographing processes by the multi-spectral camera 102, the number of processing steps can be reduced.

Also, according to the sixth embodiment, since the environmental light conversion data is pre-stored, environmental light need not always be measured. Using desired pre-stored environmental light conversion data, spectral distribution data of an object illuminated with the desired environmental light can be estimated.

When a plurality of photographing environmental light and observation environmental light are present, the above effect can be obtained by storing environmental light conversion data corresponding to each environmental light.

Seventh Embodiment

The seventh embodiment of the present invention will be described below. In the seventh embodiment, predetermined or latest photographing and observation environmental light conversion data are stored, and only when either one of these data has changed, spectral distribution data of the environmental light that has changed are acquired to generate spectral distribution data of an object in the environment.

Figure 16:
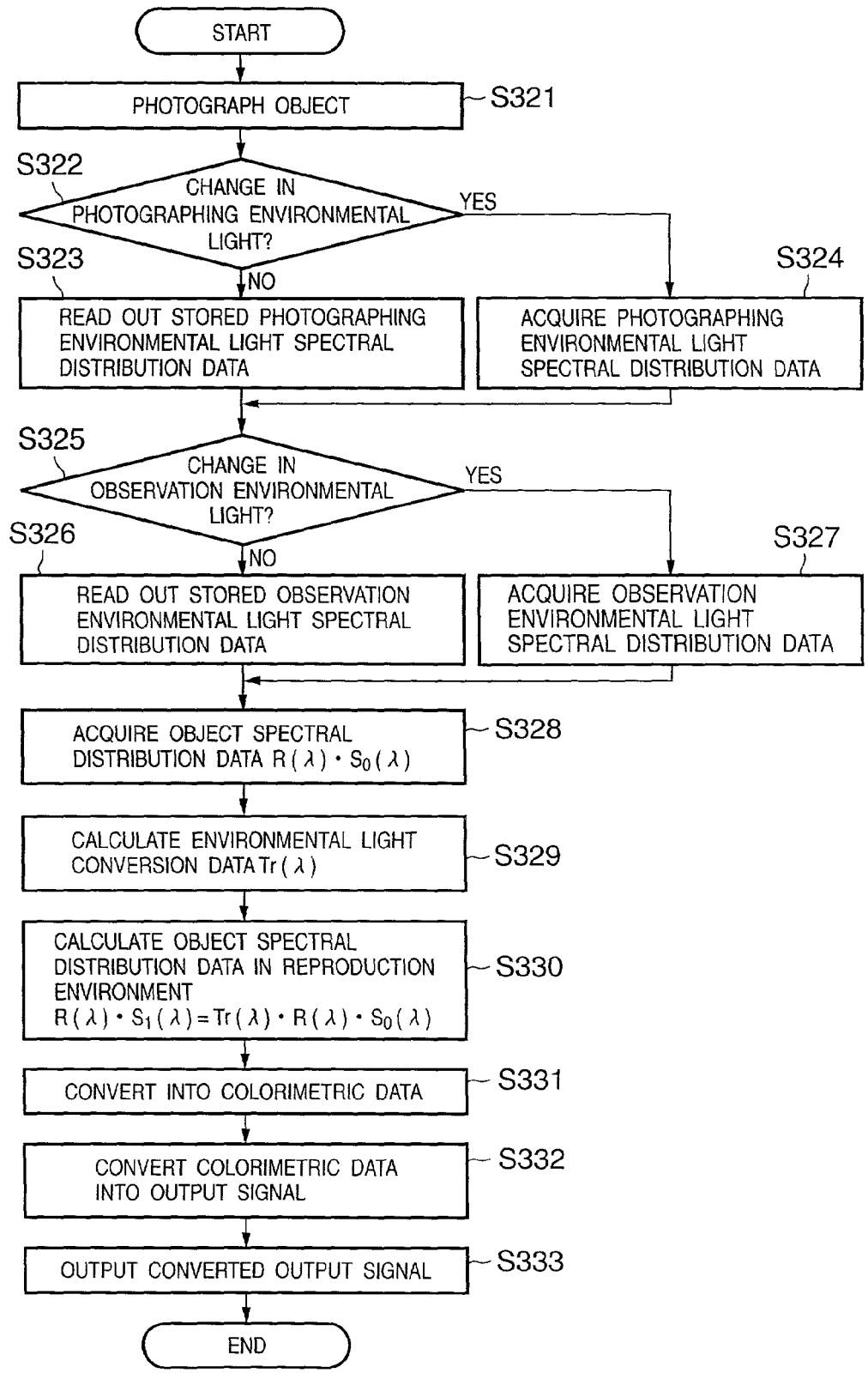
FIG. 16 is a flow chart showing the flow of processes in an image processing system according to the seventh embodiment of the present invention.

FIG. 16 is a flow chart showing the process according to the seventh embodiment.

In step S321, an image of an object is photographed using the multi-spectral camera 102. It is checked in step S322 if current spectral distribution data from the photographing environmental light spectral distribution data detector 101 have changed from those (stored in the data storage unit 106) at the previous photographing timing. If YES (changed) in step S322, the flow advances to step S324, and spectral distribution data from the photographing environmental light spectral distribution data detector 101 are input and stored in the data storage unit 106.

On the other hand, if it is determined in step S322 that the spectral distribution data have not changed or no change in spectral distribution data of photographing environmental light is detected due to the condition of photographing time intervals, user's designation, or the like, the flow advances to step S323 to read out spectral distribution data of photographing environmental light at the previous photographing timing, which are stored in the data storage unit 106.

The flow advances to step S325 to check a change in current spectral distribution data from the observation environmental light spectral distribution data detector 104. If the current spectral distribution data have changed from spectral distribution data of observation environmental light stored in the data storage unit 106, the flow advances to step S327 to acquire the spectral distribution data of observation environmental light detected by the observation environmental light spectral distribution data detector 104. On the other hand, if the detection result of the observation environmental light spectral distribution data detector 104 has not changed, or no change in spectral distribution data of observation environmental light is determined due to a condition of photographing time intervals, user's instruction, or the like, the flow advances to step S326 to read out the previously acquired spectral distribution data of observation environmental light stored in the data storage unit 106.

The flow advances to step S328 to acquire spectral distribution data obtained by photographing the object. The flow then advances to step S329 to calculate environmental light conversion data Tr($\lambda$), and the flow advances to step S330. In steps S330 to S333, an environmental light conversion process of photographed spectral distribution data, conversion into colorimetric data, and a conversion process into an output signal to be output to the output unit 105 of the image output apparatus are executed as in steps S310 to S313 in FIG. 15 above, thus reproducing an image by the output unit 105.

As described above, according to the seventh embodiment, when at least one environmental light remains the same (e.g., when continuous photographing processes are done using the multi-spectral camera 102, or when the spectral distribution data of environmental light are adjusted), since the pre-stored data can be used, the processing efficiency can be improved.

Also, according to the seventh embodiment, since spectral distribution data of environmental light are pre-stored, environmental light need not always be measured. Using pre-stored spectral distribution data of desired environmental light, spectral distribution data of an object illuminated with the desired environmental light can be easily estimated.

Eighth Embodiment

Figure 17:
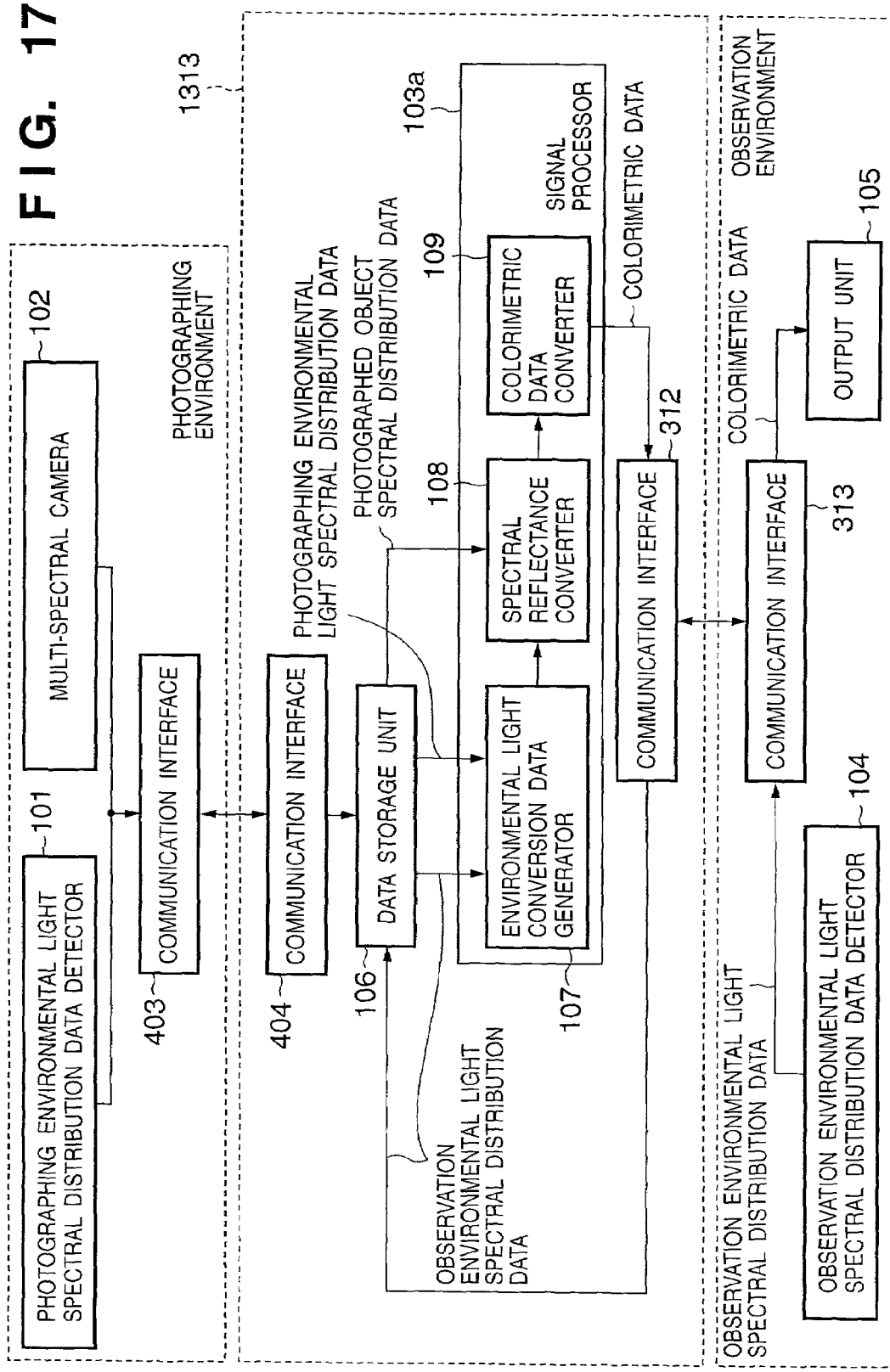
FIG. 17 is a block diagram showing an example of the arrangement of an image processing system according to the eighth embodiment of the present invention.

FIG. 17 is a block diagram showing the arrangement according to the eighth embodiment of the present invention. The same reference numerals in FIG. 17 denote the same parts as in FIG. 3, and a description thereof will be omitted.

As is apparent from comparison with FIG. 3, in the eighth embodiment, a photographing apparatus, image processing apparatus, and image output apparatus are separated from each other, and are connected via communication interfaces 312, 313, 403, and 404, and are placed in different environments. The first embodiment described above comprises the spectral distribution data presumption units 302, 304 and 310 which are used to convert spectral distribution data received as band information into multi-spectral distribution data over the full wavelength range, while the eighth embodiment can obviate the need for these units since spectral distribution data of each environmental light are input as multi-spectral distribution data over the full wavelength range.

An image processing apparatus 1313 according to the eighth embodiment is independent from both observation and photographing environments, and generates environmental light conversion data as needed on the basis of spectral distribution data received from the respective environments to convert spectral distribution data of an object. Furthermore, the image processing apparatus executes arithmetic operations to convert the spectral distribution data into colorimetric data, and outputs the calculated colorimetric data to the image output apparatus placed in the observation environment, thus reproducing an image.

The functions of the image processing apparatus according to the eighth embodiment may be implemented by a program that executes an image processing method in a processing apparatus such as a computer or the like.

Figure 18:
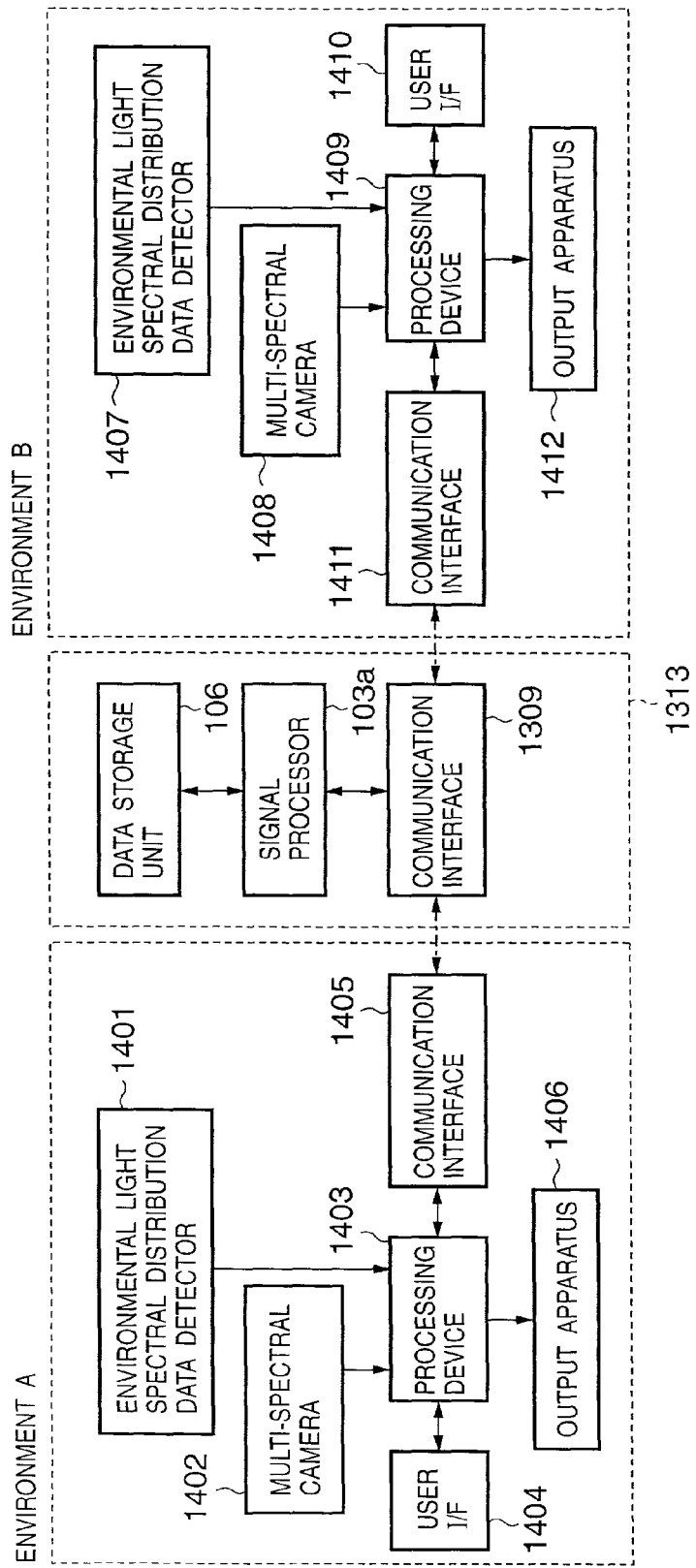
FIG. 18 is a block diagram showing the arrangement of a signal processor according to the eighth embodiment of the present invention.

For example, when environmental light attributes such as photographing and observation environments are highly likely to be different from each other, as shown in FIG. 18, apparatuses in two arbitrary environments A and B having different types of environmental light respectively comprise multi-spectral cameras 1402 and 1408, environmental light spectral distribution data detectors 1401 and 1407, processing apparatuses 1403 and 1409, communication interfaces 1405, 1309 and 1414, output apparatuses 1406 and 1412, and user I/Fs 1405 and 1410, and send images of objects photographed under different types of environmental light to the image processing apparatus 1313 that executes a conversion process of environmental light of an object via the communication interfaces 1405 and 1411.

In this arrangement, when bidirectional communication between the apparatuses are allowed, the image processing apparatus 1313 can switch as needed if the photographing environment is processed as environment A or B, or the observation environment is processed as environment A or B.

Figure 19:
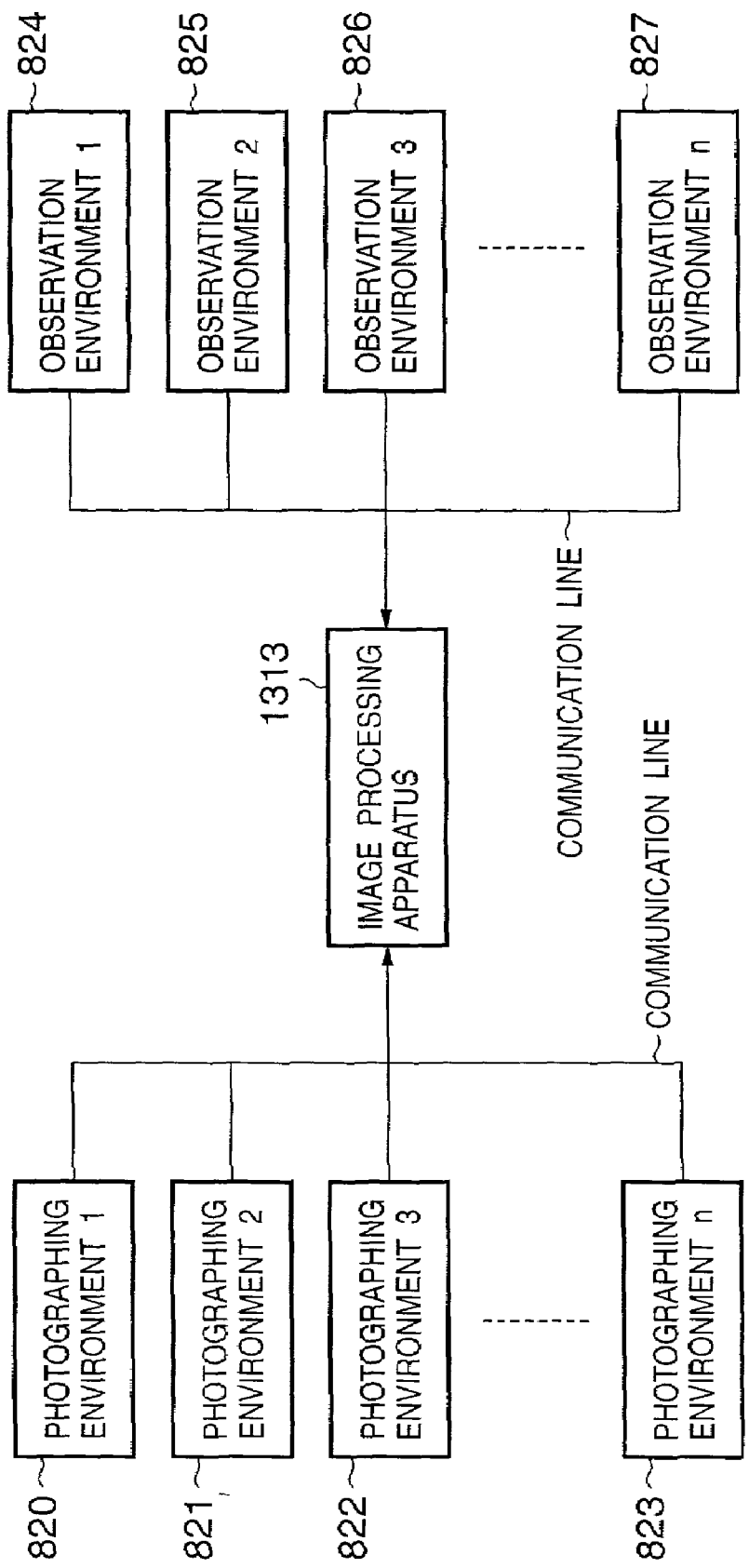
FIG. 19 is a block diagram showing the arrangement of an image output system according to the ninth embodiment of the present invention.

In the above description, one each observation and photographing environments for the image processing apparatus 1313 are defined. For example, as shown in FIG. 19, a plurality of arbitrary photographing environments 820 to 823 and a plurality of arbitrary observation environments 824 to 827 may be connected via communication lines. Note that FIG. 19 illustrates the same numbers of photographing and observation environments, but different numbers of environments may be connected.

In this case, the image processing apparatus 1313 may acquire spectral distribution data in designated photographing and observation environments, execute a colorimetric conversion process of spectral distribution data of a photographed object image, and send colorimetric data to an image output apparatus under the designated observation environmental light.

For example, the present invention can be applied to a color conversion process system in which the image processing apparatus 1313 according to the eighth embodiment is connected to a network as a color conversion process server, acquires spectral distribution data via the network, and sends colorimetric data to an image output apparatus set under observation environmental light.

Ninth Embodiment

As shown in FIG. 19, when the image processing apparatus 1313 is connected to a plurality of photographing environments 820 to 823 and a plurality of observation environments 824 to 827 via communication lines, it acquires spectral distribution data in a pair of designated photographing and observation environments, executes a colorimetric conversion process of spectral distribution data of a photographed object image, and sends colorimetric data to an image output apparatus placed under the observation environmental light.

In this case, as shown in FIG. 18, users in the respective environments can acquire spectral distribution data of photographed object images and spectral distribution data of photographing light in the photographing environments and can store and register them in the data storage unit 106 of the image processing apparatus 1313 via the user I/Fs 1404 and 1410 and communication interfaces 1405, 1411 and 1309. The registered data can be used as an image database.

FIG. 20 is a table showing an example of the data format in the data storage unit 106 in which the user registers spectral distribution data of environmental light according to the ninth embodiment of the present invention.

In FIG. 20, the data storage unit 106 stores the types of environmental light indicating if the type of registered environmental light is photographing or observation environmental light, and spectral distribution data of environmental light as values for respective wavelengths (nm). Of course, the spectral distribution data of environmental light may be registered as compressed data.

Figure 21:
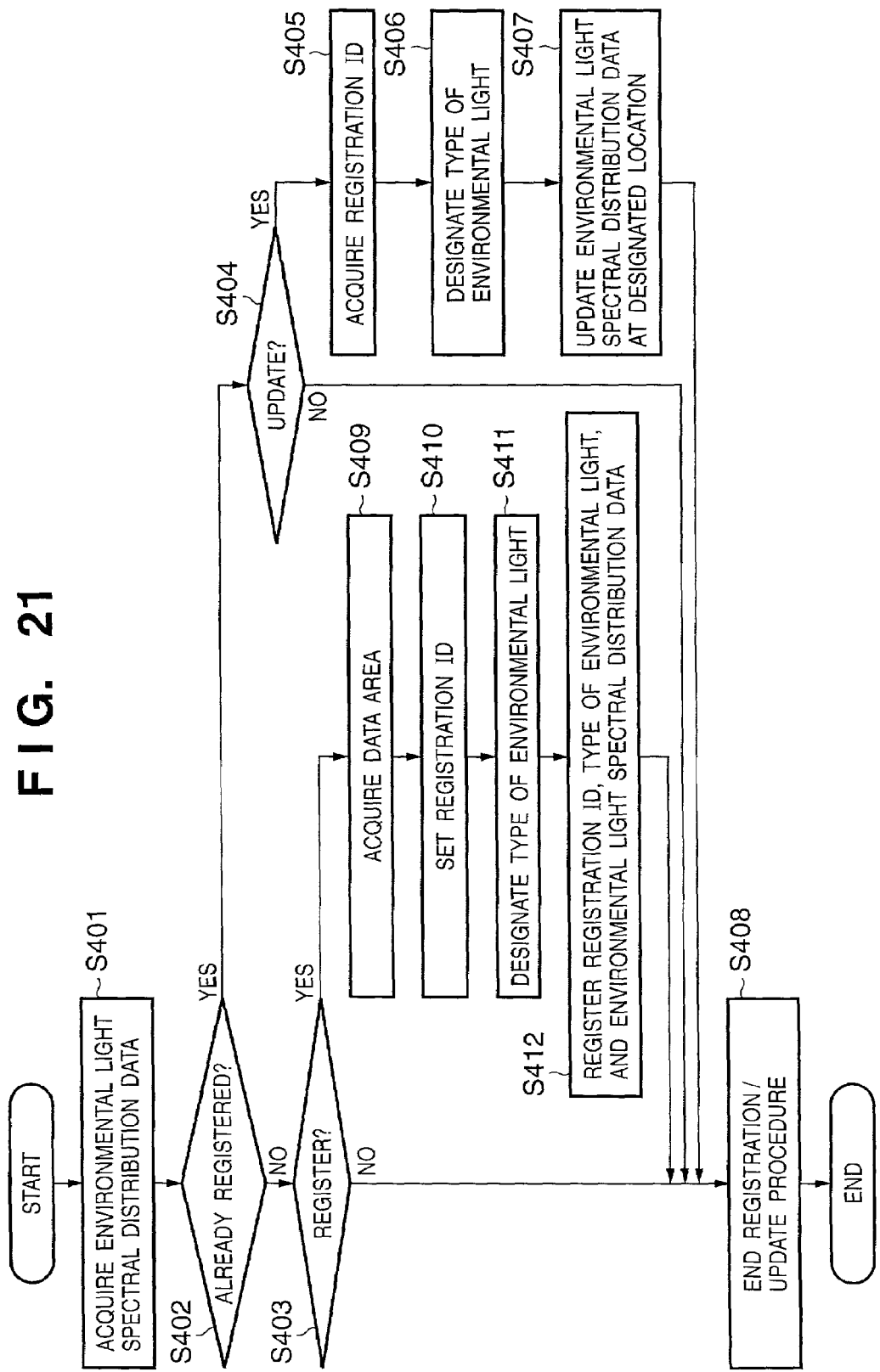
FIG. 21 is a flow chart showing the process according to the ninth embodiment of the present invention.

FIG. 21 is a flow chart showing the process according to the ninth embodiment of the present invention, i.e., registration and update processes of spectral distribution data of environmental light in the data storage unit 106 by the user.

In step S401, environmental light in a photographing or observation environment is detected by an environmental light spectral distribution data detector to acquire spectral distribution data. The flow advances to step S402 to check if the spectral distribution data of the environmental light have already been registered in the data storage unit 106. If YES in step S402, the flow advances to step S404 to check if the acquired spectral distribution data of the environmental light are stored to update old data. If YES in step S404, the flow advances to step S405, and the user inputs his or her registration ID. The flow advances to step S406, and the type of spectral distribution data of the registered environmental light is specified by the input user ID. That is, in the data format of the data storage unit 106 shown in FIG. 20, a set of environmental light data is specified.

The flow advances to step S407 to update the spectral distribution data of the new specified environmental light obtained in step S401. In step S408, the update process ends. If it is determined in step S404 that no update process is executed, the flow advances to step S408 to end the process.

On the other hand, if it is determined in step S402 that the spectral distribution data have not been registered yet, the flow advances to step S403 to check if these data are to be registered. If NO in step S403, the flow advances to step S408 to terminate the process; otherwise, the flow advances to step S409 to assure a data area memory to register a set of environmental light data in the data format of the data storage unit 106 shown in FIG. 20. The flow advances to step S410 to set and register an ID of the user. In step S411, the type of environmental light of spectral distribution data to be registered is designated in correspondence with the input user ID. The flow advances to step S412 to store the spectral distribution data of the environmental light in the corresponding data area, and to register the user ID and the type of environmental light in correspondence with the stored data. The flow advances to step S408 to terminate the registration/update procedure.

Figure 22:
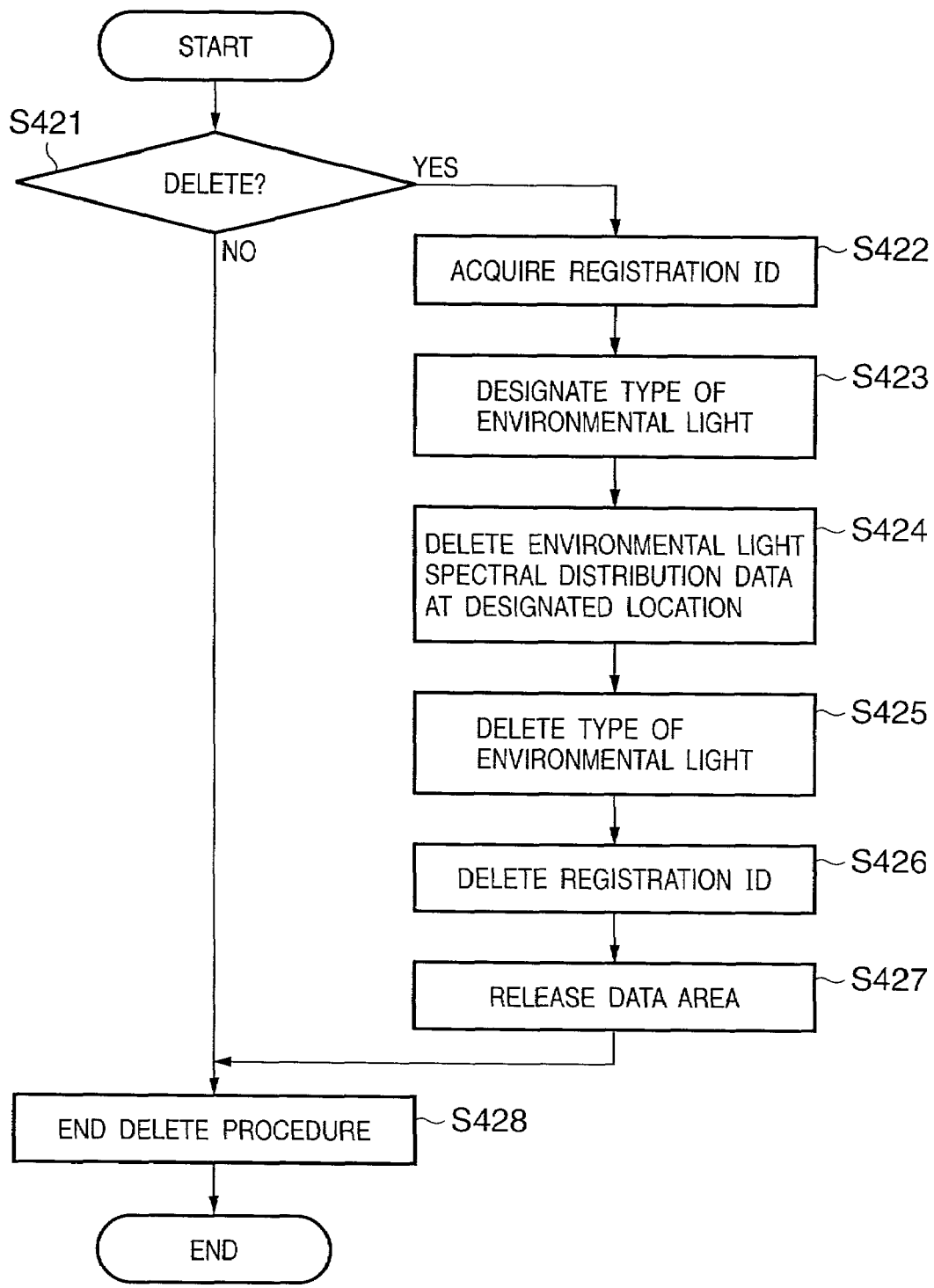
FIG. 22 is a flow chart showing the delete procedure of spectral distribution data of environmental light according to the ninth embodiment of the present invention.

FIG. 22 is a flow chart showing the deletion procedure of spectral distribution data of environmental light according to the ninth embodiment of the present invention.

It is checked in step S421 if a delete instruction of the registered spectral distribution data of environmental light is input. If NO in step S421, the flow advances to step S428 to end this delete process. On the other hand, if YES in step S421, the flow advances to step S422 to make the user input his or her registration ID. The flow advances to step S423 to designate the type of environmental light of the spectral distribution data of the environmental light to be deleted from those stored in correspondence with the user ID. In this way, a set of environmental light data to be deleted is specified from those in the data storage unit 106 shown in FIG. 20.

The flow advances to step S424 to delete the specified spectral distribution data of environmental light. The flow advances to step S425 to delete information indicating the type of environmental light of the deleted spectral distribution data of environmental light. The flow advances to step S426 to delete the registration ID (user ID) of the deleted spectral distribution data of environmental light. The flow advances to step S427 to release the memory area of the data storage unit 106, where the set of deleted environmental light data is stored. The flow then advances to step S428 to end this delete procedure.

As described above, according to the ninth embodiment, each user can register spectral distribution data of environmental light, and can update or delete data.

In this manner, when the user designates the registered spectral distribution data of environmental light, the aforementioned color conversion process can be executed without receiving spectral distribution data of environmental light for each process.

As a result, traffic efficiency upon transferring data between environments can be improved. The image processing apparatus need only execute an environmental light conversion process of spectral distribution data of an object, and can obviate the need for means used to acquire spectral distribution data of photographing environmental light and observation environmental light.

In the ninth embodiment, the user registers, updates, and deletes spectral distribution data of environmental light stored in the data storage unit 106 via the user I/F and communication interface. However, whether or not given information is registered, updated, or deleted may be automatically determined depending on the time elapsed after the detection time of environmental light.

The registration ID, the type of spectral distribution data, a parameter for designating spectral distribution data of photographing environmental light, and spectral distribution data of a photographed object image may be set in the same manner as in the data format shown in FIG. 20, and may be registered, updated, or deleted with respect to the data storage unit 106.

As described above, according to the ninth embodiment, using spectral distribution data of an object image photographed in a given environment, those of photographing environmental light, and those of observation environmental light used to observe the output image of the object, an image of the object observed under another environmental light can be accurately reproduced.

A plurality of image processors each having a plurality of photographing units and a plurality of image output units need not be provided, and a single image processing apparatus can attain accurate color reproduction by connecting a plurality of image input units and a plurality of image output units.

10th Embodiment

The 10th embodiment of the present invention will be described below.

Figure 23:
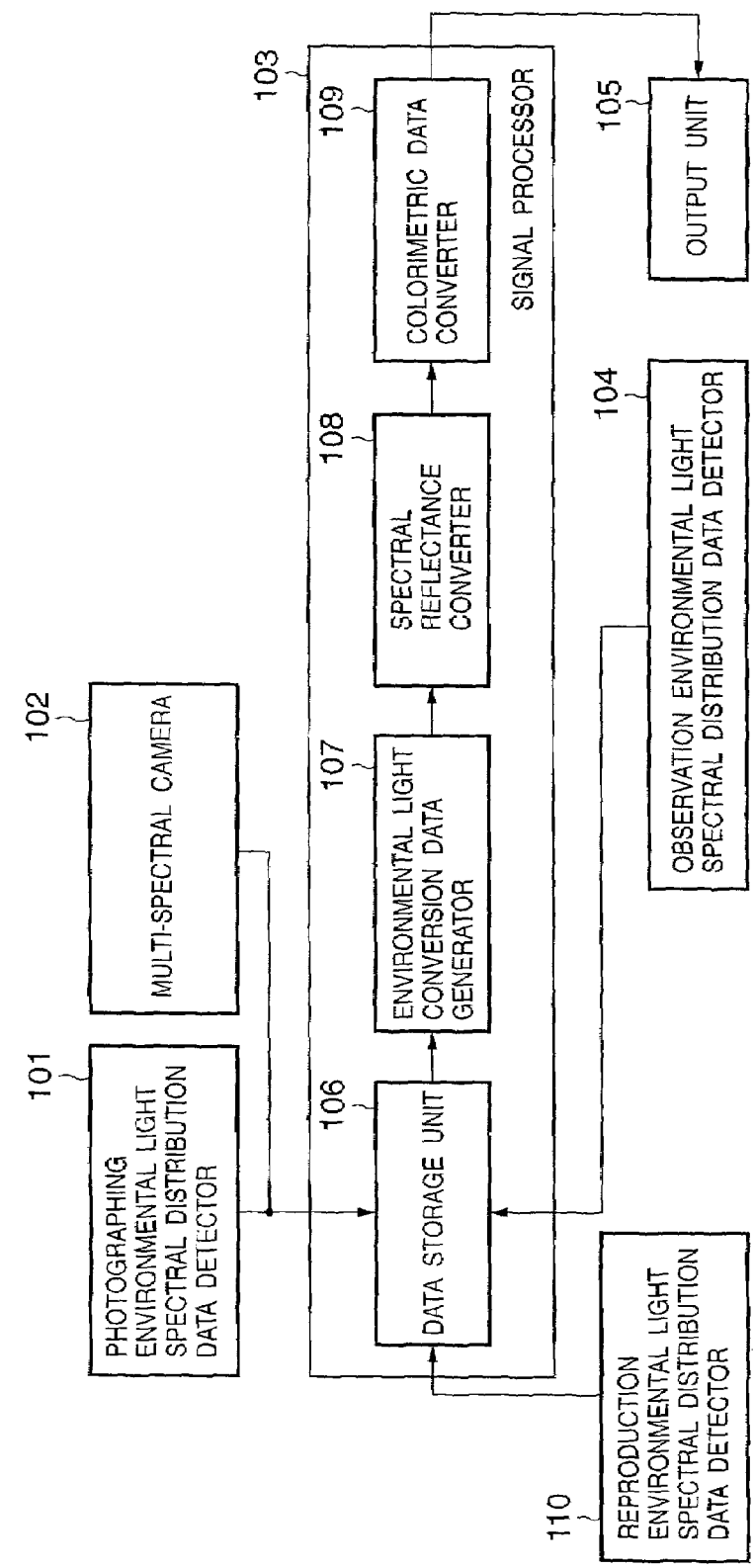
FIG. 23 is a block diagram for explaining the arrangement of an image processing system according to the 10th embodiment of the present invention.

FIG. 23 is a block diagram for explaining the arrangement according to the 10th embodiment of the present invention. The same reference numerals in FIG. 23 denote the same parts as in FIG. 1 above, and a description thereof will be omitted.

In FIG. 23, reference numeral 110 denotes a reproduction environmental light spectral distribution data detector for obtaining spectral distribution data under reproduction environmental light in an environment illuminated with illumination light (reproduction environmental light) different from the photographing and observation environments. The spectral distribution data under the reproduction environmental light are sent to and stored in the data storage unit 106. The signal processor 103 acquires spectral distribution data of an object photographed under photographing environmental light, and converts them into colorimetric data in correspondence with spectral distribution data of reproduction environmental light under which an image of the object is reproduced. Furthermore, the signal processor converts into spectral distribution data under observation environmental light under which the reproduced image is observed.

Figure 24:
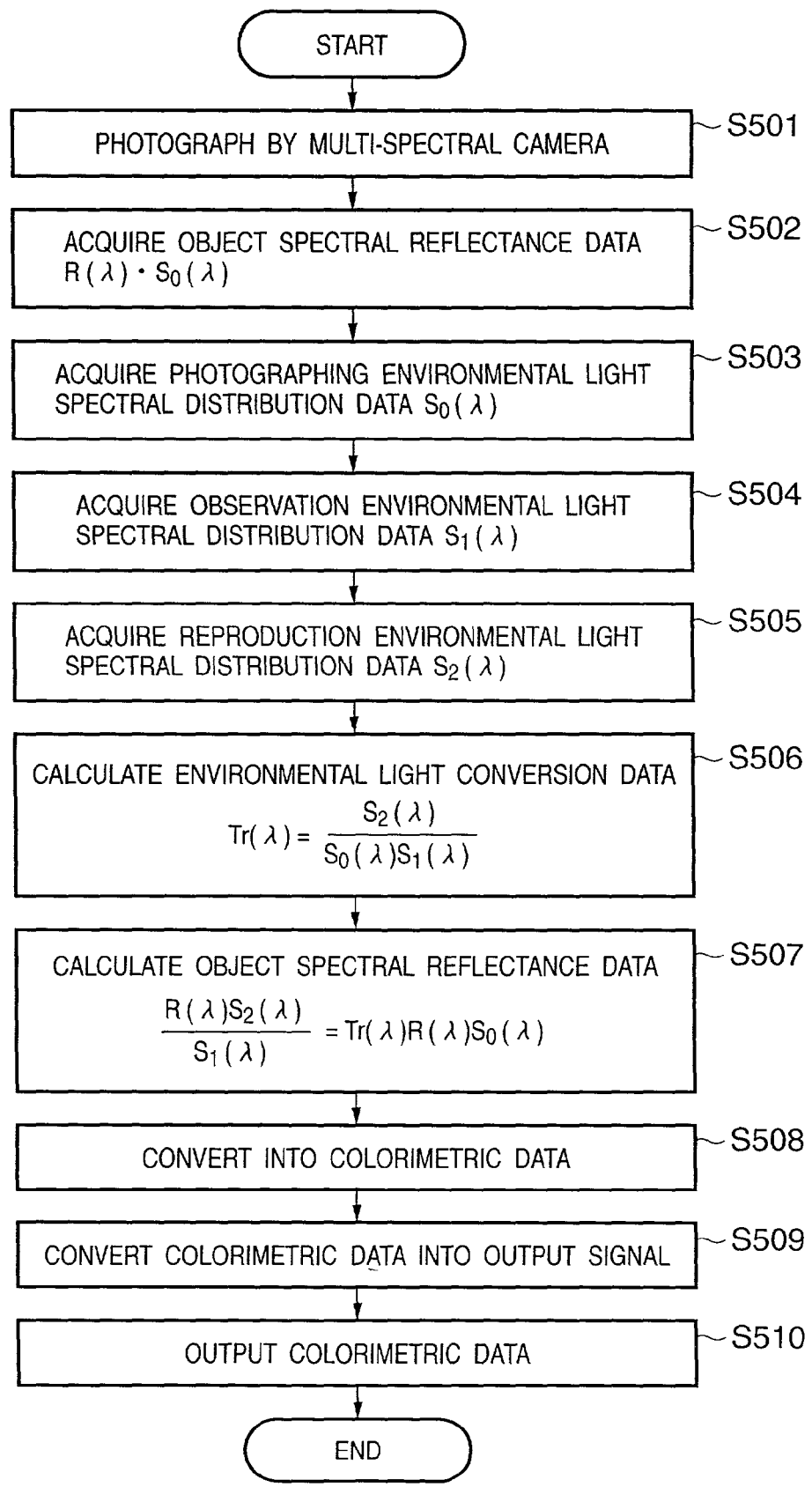
FIG. 24 is a flow chart showing the process according to the 10th embodiment of the present invention.
Figure 25:
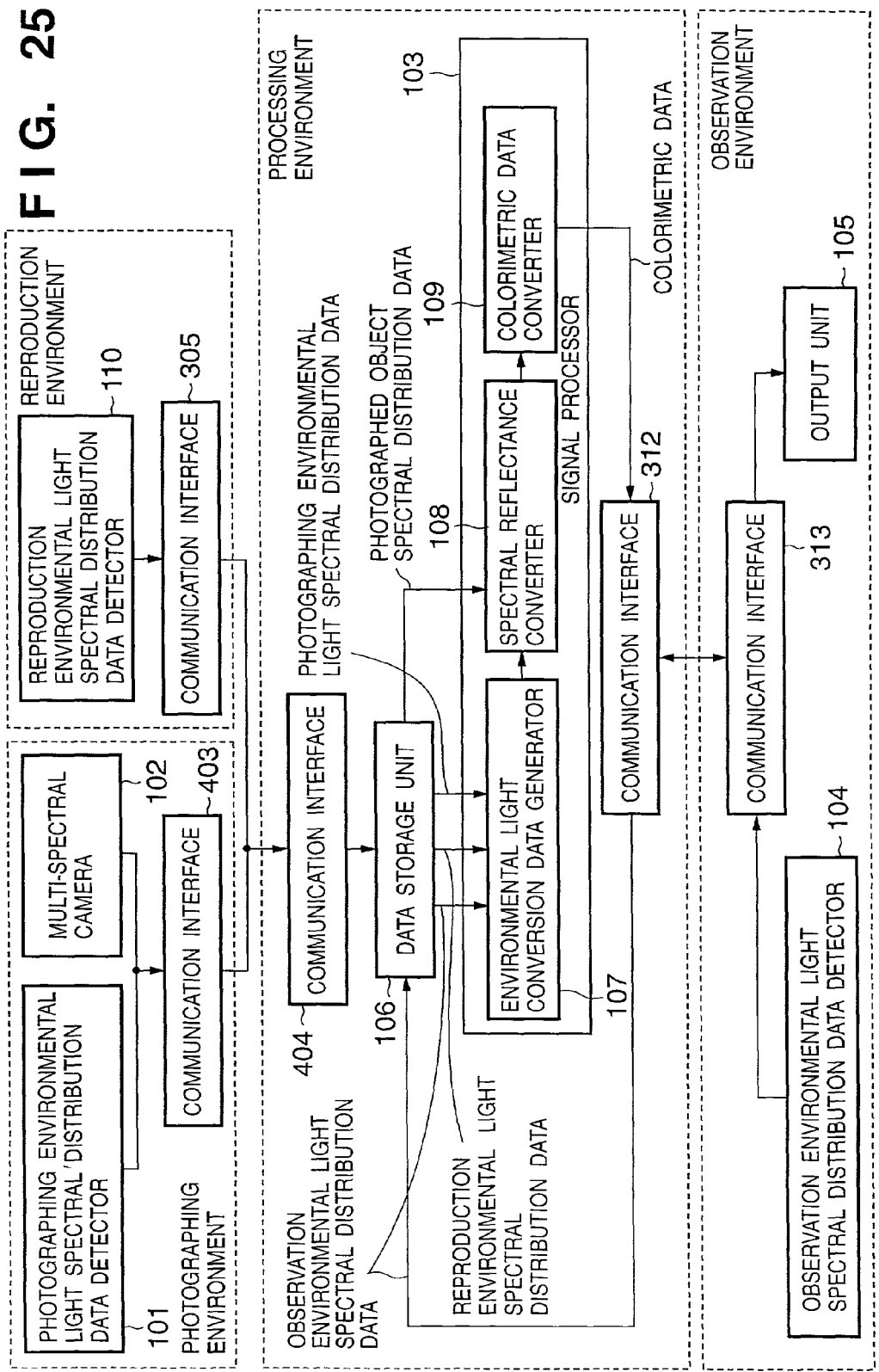
FIG. 25 is a block diagram showing the arrangement of an image processing system according to the 10th embodiment of the present invention.

FIG. 24 is a flow chart showing this process, and FIG. 25 is a block diagram showing the detailed arrangement according to the 10th embodiment. The same reference numerals in FIG. 25 denote the same parts as in FIG. 17, and a description thereof will be omitted.

As can be seen from FIGS. 25 and 17, in the image processing apparatus according to the 10th embodiment, spectral distribution data of environmental light indicating a reproduction environment are detected by the reproduction environmental light spectral distribution data detector 110 and are input via interfaces 305 and 404, unlike in the eighth embodiment. Other arrangements and processes are basically the same as those in the above embodiment, and a detailed description thereof will be omitted.

An outline of an image process using spectral distribution data according to the 10th embodiment will be described below with reference to the flow chart in FIG. 24.

In step S501, in a photographing environment in which an object is illuminated with given environmental light, an image of an object is photographed by the multi-spectral camera 102. With this operation, an image signal (spectral distribution data) corresponding to the photographed image is obtained in step S502. As a result, spectral distribution data $S0(\lambda) \cdot R(\lambda)$ as the product of spectral distribution data $S0(\lambda)$ of environmental light in the photographing environment, and spectral distribution data $R(\lambda)$ for respective pixels in the image signal of the object are obtained.

The flow advances to step S503 to obtain spectral distribution data $S0(\lambda)$ of environmental light at the photographing timing since spectral distribution data of environmental light in the photographing environment of the multi-spectral camera 102 are detected by the photographing environmental light spectral distribution data detector 101. Note that the spectral distribution data $S0(\lambda)$ of photographing environmental light may be obtained from the result obtained by photographing light reflected by a standard white plate illuminated with environmental light upon photographing by the multi-spectral camera 102. The spectral distribution data $S0(\lambda)$ of photographing environmental light and spectral distribution data $S0(\lambda) \cdot R(\lambda)$ are transferred to the image processing apparatus via the communication interfaces 403 and 404, and are stored in the data storage unit 106.

The flow then advances to step S504 to obtain spectral distribution data $S1(\lambda)$ of observation environmental light in an observation environment which is highly likely to be different from the photographing environment. These data are obtained based on the detection result from the observation environmental light spectral distribution data detector 104. The spectral distribution data $S1(\lambda)$ of observation environmental light may be detected not only by the observation environmental light spectral distribution data detector 104, but based on the result obtained by photographing a standard white plate illuminated with observation environmental light by another multi-spectral camera or the like. The acquired spectral distribution data $S1(\lambda)$ of observation environmental light are sent to the image processing apparatus via the communication interfaces 313 and 312, and are stored in the data storage unit 106.

Note that the spectral distribution data $S1(\lambda)$ of observation environmental light may be compressed by a compression processor (not shown), and the compressed data may be sent via the communication interfaces 312 and 313. In this case, the image processing apparatus may store the received data in the data storage unit 106 as compressed data or after being decompressed by a data decompression unit (not shown).

The flow then advances to step S505, and the reproduction environmental light spectral distribution data detector 110 obtains spectral distribution data $S2(\lambda)$ under reproduction environmental light which has an environmental light condition with which the object is to be illuminated, and is different from the photographing environmental light and observation environmental light. The spectral distribution data $S2(\lambda)$ of reproduction environmental light may be detected not only by the detector 110, but based on the result obtained by photographing a standard white plate illuminated with the reproduction environmental light using another multi-spectral camera or the like. The acquired spectral distribution data $S2(\lambda)$ of reproduction environmental light are transferred to the image processing apparatus via the communication interfaces 305 and 404. In this case, the spectral distribution data $S2(\lambda)$ may also be transferred and stored in the data storage unit 106 as compressed data.

The flow advances to step S506 to define environmental light conversion data $Tr(\lambda)$ as:

$$Tr(\lambda)=S2(\lambda)/(S1(\lambda) \cdot S0(\lambda)) \quad (4)$$

to obtain the spectral reflectance of the image of the object on the basis of the spectral distribution data $S0(\lambda)$ of photographing environmental light, the spectral distribution data $S1(\lambda)$ of observation environmental light used to observe an image output based on the image signal, and the spectral distribution data $S2(\lambda)$ of reproduction environmental light in the reproduction environment.

The environmental light conversion data $Tr(\lambda)$ are calculated by the environmental light conversion data generator 107.

The flow advances to step S507 to obtain spectral reflectance values $S1(\lambda) \cdot R(\lambda)$ for respective pixels of the image of the object illuminated with observation environmental light by multiplying the spectral distribution data $S0(\lambda) \cdot R(\lambda)$ stored in the data storage unit 106 by the environmental light conversion data $Tr(\lambda)$ obtained in step S506. This reflectance is calculated in the spectral reflectance converter 108 by:

$$R(\lambda) \cdot S2(\lambda)/S1(\lambda)=Tr(\lambda) \cdot R(\lambda)S0(\lambda) \quad (5)$$

The flow then advances to step S508 to integrate the spectral distribution data $R(\lambda) \cdot S2(\lambda)/S1(\lambda)$ for respective pixels of the image of the object under the spectral distribution data $S1(\lambda)$ of observation environmental light obtained in step S504 by the convolution arithmetic operations of a color matching function in an appropriately selected colorimetric system by the colorimetric data converter 109, thus converting the data into colorimetric vector data having three values. In general, device independent values of, e.g., an L*a*b* colorimetric system, XYZ colorimetric system, or the like are selected as colorimetric vector data having three values. The converted colorimetric vector data of the XYZ colorimetric system having three values are sent to the output unit 105 of the image output apparatus via the communication interfaces 312 and 313.

An example of the color matching function is that in the XYZ colorimetric system, as shown in FIG. 4 above.

The flow advances to step S509 to convert the colorimetric vector data having three values which are converted from the spectral distribution data $R(\lambda) \cdot S2(\lambda)/S1(\lambda)$ and are sent to the output unit 105 in step S508 into an optimal output signal to observation environmental light in the output unit 105 of the image output apparatus. The image output apparatus includes a display using R, G and B signals values, a printer using C, M, Y and K signals, or a display or printer which use multi-color signal values more than R, G and B or C, M, Y and K. Such image output apparatus includes a CMS (color management) function or the like for achieving appropriate color specification of three colorimetric vector values in the output unit 105 in consideration of the output characteristics of the output unit 105. Colorimetric data are converted in step S508 into an optimal output signal to observation environmental light in the output unit 105 with reference to such CMS function.

The flow advances to step S510 to output the output signal generated in step S509 to the output unit 105, thus outputting an image.

The output result from the output unit 105 of image data generated in the respective steps shown in the flow chart of FIG. 24 has a color specification having accurate color reproducibility under observation environmental light by outputting a color specification obtained when an object photographed under photographing environmental light is observed under different reproduction environmental light.

Note that the arrangement of the multi-spectral camera 102 according to the 10th embodiment is the same as that shown in FIG. 5, and the process of band information is also the same as that in the above embodiment. Hence, a detailed description thereof will be omitted.

In this case, in the block diagram shown in FIG. 25, a photographing object spectral distribution data presumption unit is arranged in the multi-spectral camera 102 or image processing apparatus, and generates multi-spectral distribution data used in the image processing apparatus on the basis of band information input as information for respective bands. This process is the same as that in the above embodiment.

Figure 26:
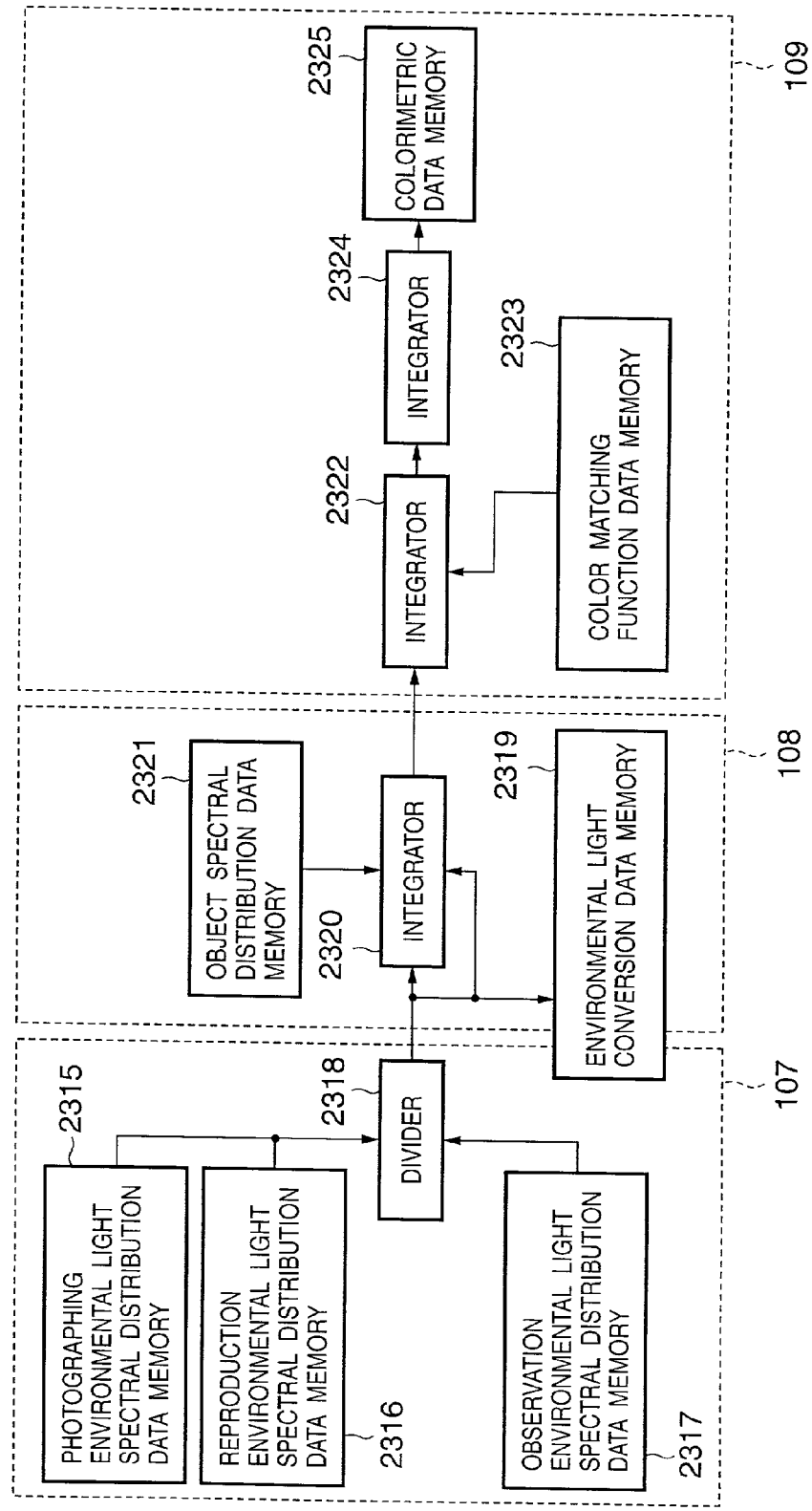
FIG. 26 is a block diagram showing the arrangement of a signal processor according to the 10th embodiment of the present invention.
Figure 27:
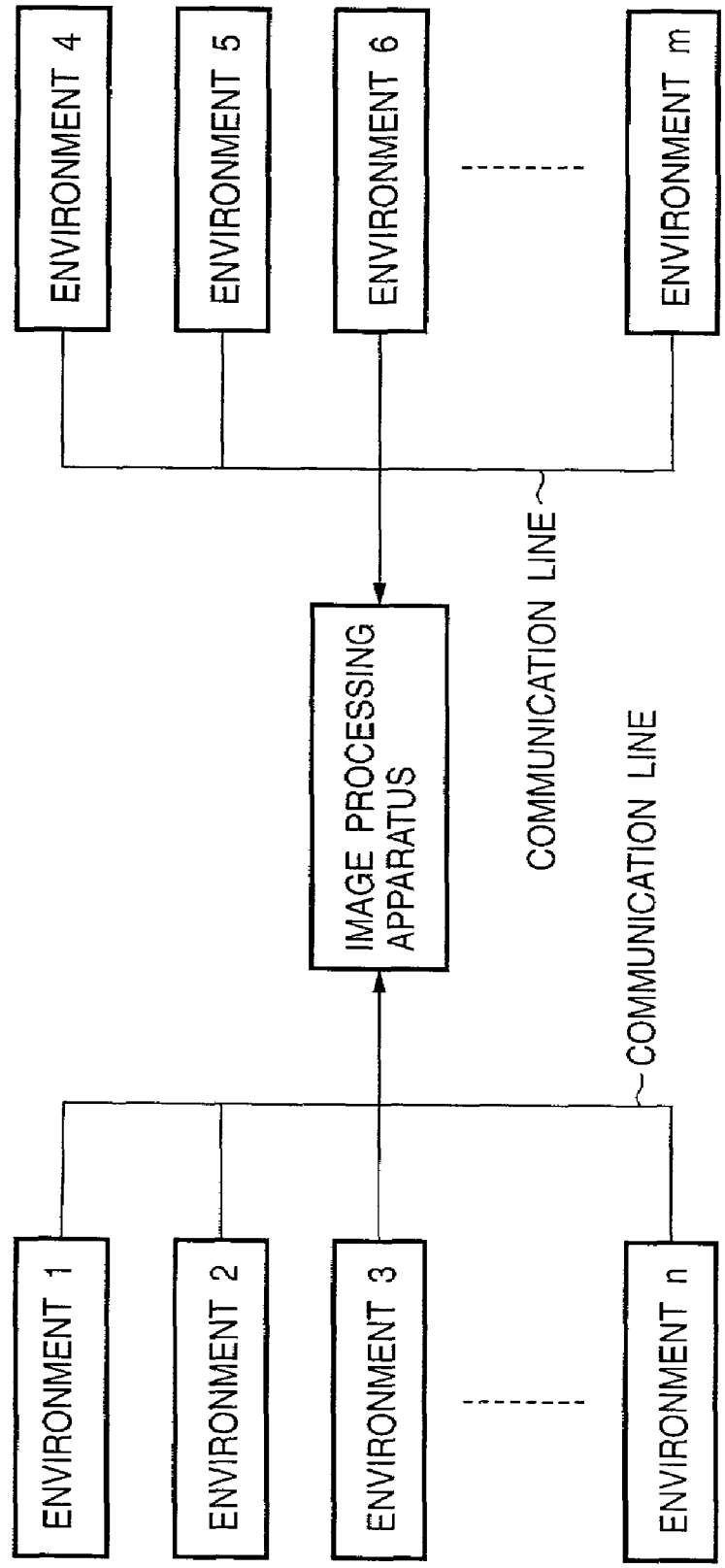
FIG. 27 is a block diagram for explaining the arrangement of an image processing system according to the 11th embodiment of the present invention.

The signal processor 103 in the image processing apparatus shown in FIG. 25 comprises three signal processing units, i.e., the environmental light conversion data generator 107, spectral reflectance converter 108, and colorimetric data converter 109. FIG. 26 is a block diagram showing the detailed arrangement of these environmental light conversion data generator 107, spectral reflectance converter 108, and colorimetric data converter 109.

Referring to FIG. 26, data memories 2315, 2316, 2317 and 2321 that store spectral distribution data and the like receive data from the data storage unit 106 in the image processing apparatus as needed.

The environmental light conversion data generator 107 receives the spectral distribution data $S0(\lambda)$ of photographing environmental light from the photographing environmental light spectral distribution data memory 2315, the spectral distribution data $S1(\lambda)$ of observation environmental light from the observation environmental light spectral distribution data memory 2317, and the spectral distribution data $S2(\lambda)$ of reproduction environmental light from the reproduction environmental light spectral distribution data memory 2316, and supplies them to a divider 2319. The divider 2319 stores a result $(S2(\lambda)/(S0(\lambda) \cdot S1(\lambda)))$ obtained by dividing the spectral distribution data of reproduction environmental light by the spectral distribution data of photographing environmental light and those of observation environmental light in an environmental light conversion data memory 2319 as environmental light conversion data $Tr(\lambda)$.

The spectral reflectance converter 108 reads out spectral distribution data $(S0(\lambda) \cdot R(\lambda))$ of the photographed object image from the object spectral distribution data memory 2321, and supplies them to an integrator 2320, which multiplies them by the environmental light conversion data $Tr(\lambda)$ from the environmental light conversion data memory 2319 to obtain a result $(R(\lambda) \cdot S2(\lambda)/S1(\lambda))$.

The colorimetric data converter 109 multiplies the product of the spectral distribution data of the object and environmental light conversion data by a color matching function supplied from a color matching function data memory 2323, and makes convolution arithmetic operations of the product using an integrator 2324 to calculate ternary colorimetric data. The calculation result is stored in a colorimetric data memory 2325.

Since the detailed arrangement of the output unit 105 including an image output apparatus in the observation environment shown in FIG. 25 is the same as that shown in FIG. 10 above, a description thereof will be omitted. Also, since the arrangement of the image processing apparatus is the same as that shown in FIG. 11 above, a description thereof will be omitted.

11th Embodiment

In the 11th embodiment, the number of each of photographing, observation, and reproduction environments, which are connected to the image processing apparatus via communication interfaces, is not limited to one, but arbitrary numbers of environments may be connected. Hence, this embodiment comprises an arrangement for acquiring spectral distribution data in respective environments and storing them in the data storage unit 106.

Therefore, in the 11th embodiment, a plurality of environments 1 to n and environments 1 to m are connected to the image processing apparatus via communication lines. In this way, from these plurality of environments, a set of environments including desired photographing, observation, and reproduction environments can be defined by, e.g., user's designation.

From these environments defined as photographing, observation, and reproduction environments, spectral distribution data of photographing environmental light of a photographed object are acquired via the communication line, and those of environmental light from the environment defined as the reproduction environment are input, thus obtaining optimal colorimetric data to an image output apparatus placed in the environment defined as the observation environment.

For example, the image processing apparatus of the 11th embodiment is connected to a network as a color conversion process server, acquires spectral distribution data of corresponding environmental light and those of the photographed object image via the network, and sends colorimetric data to an image output apparatus placed in the environment defined as the observation environment, thus reproducing an image.

According to the 11th embodiment, the color specification of an object placed under desired environmental light can be accurately expressed under observation environmental light between two arbitrarily defined environments.

As a consequence, photographing and its optimal color reproduction in different environments connected via the network can be implemented.

12th Embodiment

Figure 28:
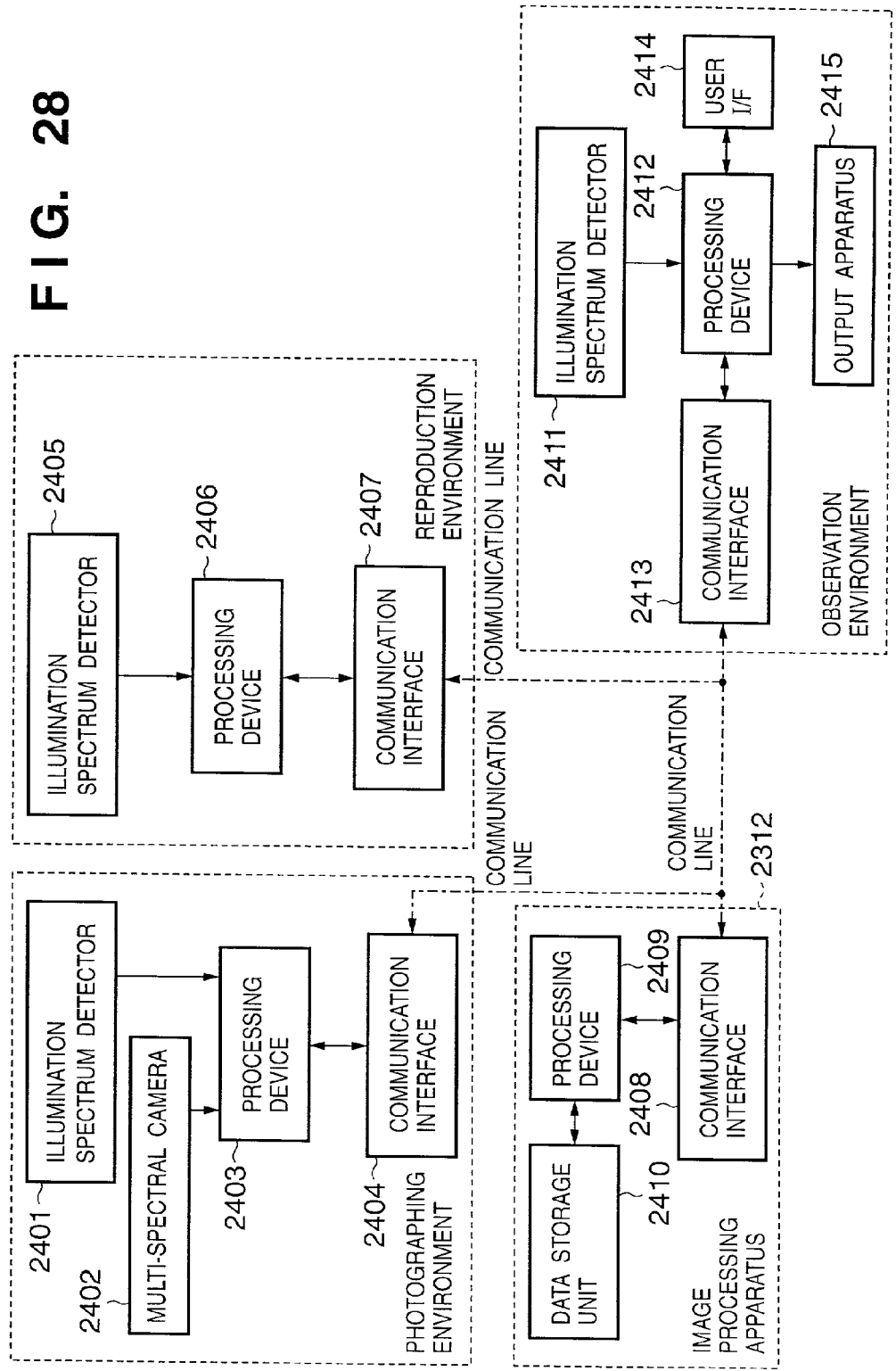
FIG. 28 is a block diagram for explaining the arrangement of an image processing system according to the 12th embodiment of the present invention.

In the 12th embodiment, as shown in the block diagram of FIG. 28, an image processing apparatus 2312 comprises a data storage device 2410 for storing spectral distribution data of an object photographed by a multi-spectral camera 2402, and those of respective kinds of environmental light, and a processing device 2409 which comprises a database manager for registering, updating, deleting, and reading out these spectral distribution data.

The image processing apparatus 2312 is connected to photographing, observation, and reproduction environments via communication lines and communication interfaces

2404, 2407, 2408 and 2413. An arbitrary number of each of these environments may be connected, and the image processing apparatus 2312 can acquire spectral distribution data of environmental light in each environment and can store them in the data storage device 2410.

The photographing environment has an illumination spectrum detector 2401 for measuring the spectral distribution of photographing environmental light, the multi-spectral camera 2402, a processing device 2403, and the communication interface 2404. The reproduction environment has an illumination spectrum detector 2405 for measuring the spectral distribution of reproduction environmental light, a processing device 2406, and the communication interface 2407. Furthermore, the observation environment has an illumination spectrum detector 2411 for measuring the spectral distribution of observation environmental light, a user interface 2414, a processing device 2412, an output device 2415, and the communication interface 2413. The observation environment acquires spectral distribution data of environmental light (illumination light) in respective environments, and transfers them to the image processing apparatus 2312.

In the 12th embodiment, spectral distribution data of reproduction environmental light detected in an arbitrary reproduction environment, those of photographing environmental light detected in a photographing environment in which an arbitrary object image is photographed, and those of standard environmental light such as sun light, an incandescent lamp, a fluorescent lamp, and the like are registered in advance in the data storage device 2410.

In an arbitrary observation environment, the user on the observation side instructs the image processing apparatus 2312 from the user I/F 2414 via the communication line and communication interface 2413 to designate spectral distribution data obtained by photographing an arbitrary object image, and those of arbitrary reproduction environmental light in the data storage device 2410. Also, the processing device 2412 can detect spectral distribution data of environmental light in the observation environment using the illumination spectrum detector 2411, and can transfer them to the image processing apparatus 2312 via the communication interface 2413.

The image processing apparatus 2312 selects spectral distribution data of corresponding photographing environmental light on the basis of those obtained by photographing an arbitrary object image, which are selected from the observation environment. The image processing apparatus 2312 generates environmental light conversion data according to the 12th embodiment on the basis of the selected spectral distribution data of the photographing environmental light, those of the reproduction environmental light, and the received spectral distribution data of the observation environmental light. After the spectral distribution data of the photographed object image are converted using the environmental light conversion data, the converted data are converted into colorimetric data, which are transferred to the observation environment side. Upon receiving the colorimetric data, the observation environment side converts the received colorimetric data into an output signal to the output device 2415, which outputs an image.

With the aforementioned processes, in the observation environment, the color specification of an object photographed under different photographing environmental light, which is illuminated with illumination light of the desired reproduction environment designated by the user, can be accurately reproduced under observation environmental light upon reproducing an image.

Spectral distribution data of observation environmental light detected by the illumination spectrum detector 2411 in the observation environment can be registered in the data storage device 2410 of the image processing apparatus 2312, and the database manager of the image processing apparatus 2312 can be instructed to register these data together with identification information such as the user ID or the like. When the registered spectral distribution data of the observation environmental light are designated, the processing device 2409 of the image processing apparatus 2312 reads out the designated spectral distribution data of the observation environmental light from the data storage device 2410.

In this way, since the observation environment need not transfer spectral distribution data of environmental light for every process, the traffic efficiency of the communication lines can be improved. Also, it is easy to update and delete the registered spectral distribution data.

The 12th embodiment can be applied to, e.g., an on-line catalog shopping system that exploits the Internet. More specifically, for a user who wants to do some catalog shopping, the color specifications of products registered in the data storage device 2410 of the image processing apparatus 2312 can be reproduced as colors the user observes them under his or her desired reproduction environmental light. In this manner, the user can make appropriate decision upon purchasing the product.

Furthermore, a user can register spectral distribution data of an image photographed by the multi-spectral camera 2402, and those of photographing environmental light detected upon photographing in the image processing apparatus 2312. As a result, the user can convert the color of the photographed image into a color specification under his or her desired reproduction environmental light in the image processing apparatus 2312 according to the 12th embodiment. Also, this embodiment can be applied when another user designates a registered (published) photographed image.

Moreover, the user can arbitrarily register arbitrarily detected spectral distribution data of reproduction environmental light in the data storage device 2410.

The image processing apparatus 2312 according to the 12th embodiment has the data storage device 2410 which stores/registers and manages spectral distribution data of a photographed object image, those of environmental light in the photographing environment, and those of reproduction environmental light, and a user in an arbitrary observation environment can register spectral distribution data of the observation environmental light in the data storage device 2410 together with his or her user ID. When a user in a given observation environment designates photographed image data (spectral distribution data) of a certain object, spectral distribution data of the reproduction environmental light, and the registered spectral distribution data of the observation environmental light, the image processing apparatus 2312 may execute a colorimetric conversion process of spectral distribution data of the photographed object image on the basis of spectral distribution data of the photographing environment in which the object image was photographed, and those of the reproduction and observation environments, and may send and output the converted colorimetric data to the output device 2415 placed under the designated observation environmental light.

On the other hand, when a user in a given observation environment designates spectral distribution data of observation environmental light registered in the image processing apparatus 2312, the image processing apparatus 2312 need not receive those of environmental light from the observation environment for every process. In this way, the traffic efficiency upon data transfer can be improved.

The image processing apparatus 2312 can serve as a color conversion server connected to, e.g., a network.

In the 12th embodiment, since the image processing apparatus 2312 can receive spectral distribution data of environmental light from a plurality of photographing environments, it stores the spectral distribution data of environmental light in the respective photographing environments or environmental light conversion data in the data storage device 2410. If spectral distribution data of each photographing environmental light remain the same, the image processing apparatus 2312 need only receive spectral distribution data of a photographed object image alone, and can look up the data storage device 2410 to obtain those of photographing environmental light. In this way, the data transfer efficiency can be improved.

13th Embodiment

As described in the fifth embodiment, since various arrangements of multi-spectral cameras are available, the characteristics of a multi-spectral camera influence photographed spectral distribution data. For this reason, when an identical object is photographed by cameras with different arrangements, different spectral distribution data are obtained.

To correct such influence, a multi-spectral camera may have a mechanism for holding profile data that describes characteristic information and correction information of the multi-spectral camera, and a mechanism for correcting photographed spectral distribution data in accordance with the profile data, and may pass the corrected spectral distribution data to an image processing apparatus.

Alternatively, spectral distribution data photographed by a multi-spectral camera and profile data may be passed to an image processing apparatus/signal processor as an image input signal. The image processing apparatus/signal processor may correct spectral distribution data in accordance with the received profile data using a mechanism for correcting photographed spectral distribution data, and may then execute an image process.

Note that this embodiment can be applied to the multi-spectral cameras, spectral distribution data detectors, their processors, and image processing apparatuses/signal processors in the first to 12th embodiments.

In this way, since an image process is executed after the influence of the characteristics of a multi-spectral camera is removed from photographed spectral distribution data, an output device can implement accurate color reproduction.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to this embodiment, spectral distribution data of an object illuminated with different environmental light can be accurately reproduced without calculating spectral reflectance $R(\lambda)$ of the object by a spectral reflectance conversion process using spectral distribution data of the photographed object image, and environmental light conversion data obtained from spectral distribution data of two different kinds of environmental light.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   acquisition means for acquiring object spectral data depending on a photographing environment of a photographed object, with respect to each pixel of the photographed object, photographing environment spectral data of the photographing environment, and observation environment spectral data of an observation environment in which an image output from image output means for outputting an image is to be observed;
   calculating means for calculating environment conversion data using an item of the photographing environment spectral data and an item of the observation environment spectral data, without regard to a number of pixels of the photographed object; and
   conversion means for converting the object spectral data of the each pixel acquired by said acquisition means into observation object spectra data depending on the observation environment, by multiplying the object spectral data of the each pixel acquired by said acquisition means by the environment conversion data calculated by said calculating means.

2. The apparatus according to claim 1, further comprising a multi-spectral camera for inputting the object spectral data corresponding to discrete wavelengths of a photographed object.

3. The apparatus according to claim 1, further comprising image output means for outputting an image on the basis of the observation object spectral data.

4. The apparatus according to claim 1, further comprising photographing environment detection means for detecting a photographing environment of the object spectral data, and outputting the photographing environment spectral data.

5. The apparatus according to claim 1, further comprising observation environment detection means for detecting an observation environment in which the image output from the image output means is to be observed, and outputting the observation environment spectral data.

6. The apparatus according to claim 1, further comprising:
input means for inputting spectral data of the photographed object corresponding to discrete wavelengths; and
interpolating means for interpolating the spectral data inputted by said input means and generating the object spectral data.

7. The apparatus according to claim 1, wherein said acquisition means comprises storage means for storing the photographing environment spectral data and the observation environment spectral data.

8. The apparatus according to claim 1, wherein said acquisition means also acquires reproduction environment spectral data of a reproduction environment in which the image of the object is to be reproduced, and said calculating means calculates the environment conversion data based on the photographing environment spectral data, the observation environment spectral data, and the reproduction environment spectral data.

9. The apparatus according to claim 7, wherein said storage means includes (1) specifying information that specifies at least the photographing environment spectral data or the observation environment spectral data, and (2) information that specifies a user who stored the photographing environment spectral data or the observation environment spectral data, and
the photographing and observation environment spectral data stored in said storage means can be updated from a photographing environment and an observation environment, respectively.

10. The apparatus according to claim 1, further comprising data compression means for compressing at least one of the object spectral data, the photographing environment spectral data, and the observation environment spectral data.

11. The apparatus according to claim 10, wherein when the object spectral data corresponds to discrete wavelengths, said data compression means compresses the object spectral data on the basis of inter-frame correlation and intra-frame correlation of pixel values.

12. The apparatus according to claim 10, wherein when the photographing environment spectral data or the observation environment spectral data corresponds to discrete wavelengths, said data compression means compresses the photographing environment spectral data or the observation environment spectral data based on correlation of spectral values.

13. An image processing method comprising:
an acquisition step of acquiring object spectral data depending on a photographing environment of a photographed object, with respect to each pixel of the photographed object, photographing environment spectral data of the photographing environment, and observation environment spectral data of an observation environment in which an image output from image output means for outputting an image is to be observed;
a calculation step of calculating environment conversion data using an item of the photographing environment spectral data and an item of the observation environment spectral data, without regard to a number of pixels of the photographed object; and
a conversion step of converting the object spectral data of the each pixel acquired in said acquisition step into observation object spectra data depending on the observation environment, by multiplying the object spectral data of the each pixel acquired in said acquisition step by the environment conversion data calculated in said calculation step.

14. The method according to claim 13, further comprising an image input step of inputting object spectral data of a photographed object.

15. The method according to claim 13, further comprising an image output step of outputting an image on the basis of the observation object spectral data converted in said conversion step.

16. The method according to claim 13, further comprising a photographing environment detection step of detecting a photographing environment of the object spectral data, and outputting the photographing environment spectral data.

17. The method according to claim 15, further comprising an observation environment detection step of detecting an observation environment in which the image output at said image output step is to be observed, and outputting the observation environment spectral data.

18. The method according to claim 13, further comprising:
an input step of inputting spectral data of the photographed object corresponding to discrete wavelengths; and
an interpolating step of interpolating the spectral data inputted in said input step and generating the object spectral data.

19. The method according to claim 13, wherein in said acquisition step, the photographing environment spectral data and the observation environment spectral data stored in a memory are acquired.

20. The method according to claim 13, wherein in said acquisition step, reproduction environment spectral data of a reproduction environment in which the image of the object is to be reproduced, is acquired, and in said calculation step, the environment conversion data is calculated based on the photographing environment spectral data, the observation environment spectral data, and the reproduction environment spectral data.

21. The method according to claim 19, wherein the memory includes (1) specifying information that specifies at least the photographing environment spectral data or the observation environment spectral data, and (2) information that specifies a user who stored the photographing environment spectral data or the observation environment spectral data, and
the photographing and observation environment spectral data stored in the memory can be updated from a photographing environment and an observation environment, respectively.

22. The method according to claim 13, further comprising a data compression step of compressing at least one of the object spectral data, the photographing environment spectral data, and the observation environment spectral data.

23. The method according to claim 22, wherein in said data compression step, when the object spectral data corresponds to discrete wavelengths, the object spectral data is compressed on the basis of inter-frame correlation and intra-frame correlation of pixel values.

24. The method according to claim 22, wherein in said data compression step, when the photographing environment spectral data or the observation environment spectral data corresponds to discrete wavelengths, the photographing environment spectral data or the observation environment spectral data is compressed based on correlation of the spectral values.

25. A computer readable storage medium storing executable code, the code comprising:

an acquisition step module for acquiring object spectral data depending on a photographing environment of a photographed object, with respect to each pixel of the photographed object, photographing environment spectral data of the photographing environment, and observation environment spectral data of an observation environment in which an image output from image output means for outputting an image is to be observed;

a calculation step of calculating environment conversion data using an item of the photographing environment spectral data and an item of the observation environment spectral data, without regard to a number of pixels of the photographed object; and a conversion step of converting the object spectral data of the each pixel acquired in said acquisition step module into observation object spectra data depending on the observation environment, by multiplying the object spectral data of the each pixel acquired in said acquisition step by the environment conversion data calculated in said calculation step.

26. An image processing apparatus comprising:

an acquisition unit configured to acquire object spectral data depending on a photographing environment of a photographed object, with respect to each pixel of the photographed object, photographing environment spectral data of the photographing environment, and observation environment spectral data of an observation environment in which an image output from image output means for outputting an image is to be observed;

a calculation unit configure to calculate environment conversion data using an item of the photographing environment spectral data and an item of the observation environment spectral data, without regard to a number of pixels of the photographed object; and a conversion unit configured to convert the object spectral data of the each pixel acquired by said acquisition unit into observation object spectra data depending on the observation environment, by multiplying the object spectral data of the each pixel acquired by said acquisition unit by the environment conversion data calculated by said calculation unit.

* * * * *

UNITED STATES PATENT AND TRADEMARK OFFICE
CERTIFICATE OF CORRECTION

| | | |
|---|---|---|
| PATENT NO. | : 7,230,642 B2 | Page 1 of 2 |
| APPLICATION NO. | : 10/012377 | |
| DATED | : June 12, 2007 | |
| INVENTOR(S) | : Yoshiko Iida et al. | |

It is certified that error appears in the above-identified patent and that said Letters Patent is hereby corrected as shown below:

COLUMN 1:

Lines 27-28, "arbitrary another" should read --another arbitrary--; and
    Line 47, "the" should read --that--.

COLUMN 7:

Line 58, "toga" should read --to a--.

COLUMN 26:

Line 24, "them" should be deleted; and
    Line 38, "arbitrarily" (2nd occurrence) should be deleted.

COLUMN 28:

Line 48, "spectra" should read --spectral--.

COLUMN 29:

Line 66, "spectra" should read --spectral--.

COLUMN 31:

Line 18, "spectra" should read --spectral--.

UNITED STATES PATENT AND TRADEMARK OFFICE
CERTIFICATE OF CORRECTION

PATENT NO. : 7,230,642 B2
APPLICATION NO. : 10/012377
DATED : June 12, 2007
INVENTOR(S) : Yoshiko Iida et al.

It is certified that error appears in the above-identified patent and that said Letters Patent is hereby corrected as shown below:

COLUMN 32:

Line 10, "configure" should read --configured--; and
Line 17, "spectra" should read --spectral--.

Signed and Sealed this

Ninth Day of September, 2008

JON W. DUDAS
*Director of the United States Patent and Trademark Office*